US007579972B2

(12) United States Patent
Copeland et al.

(10) Patent No.: US 7,579,972 B2
(45) Date of Patent: Aug. 25, 2009

(54) RISA CONTROLLER FOR AN RF INTEGRATED CIRCUIT (RFIC) HAVING IMPROVED EXECUTION SPEED

(75) Inventors: David George Copeland, Palm Harbor, FL (US); Patrick Arthur McCabe, Crystal Beach, FL (US); Rocky Ardy Ilen, Tampa, FL (US); Jonathan Borui Kang, Tampa, FL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/948,546

(22) Filed: Nov. 30, 2007

(65) Prior Publication Data

US 2009/0140901 A1 Jun. 4, 2009

(51) Int. Cl.
*H03M 1/66* (2006.01)
(52) U.S. Cl. .................. 341/144; 341/145; 341/101; 341/152
(58) Field of Classification Search .................. 341/101, 341/100, 144, 145, 155, 152
See application file for complete search history.

(56) References Cited

U.S. PATENT DOCUMENTS 6,360,319 B1 * 3/2002 Arsenault et al. ............. 713/1

7,064,690 B2 * 6/2006 Fowler et al. ................ 341/101
2002/0121995 A1 * 9/2002 Tabler ........................ 341/145
2002/0171576 A1 * 11/2002 Agizim et al. .............. 341/152

OTHER PUBLICATIONS

Extended European Search report, EP 08169841.7, Examiner Antonio Operti, Munich, Apr. 30, 2009.
Anonymous: "The I2C Specification 2.1", N/A, Jan. 1, 2000, XP030001520.
"PCI Local Bus Specification - Revision 3.0-Bus Operation", PCI Local Bus Specification, Revision No. 3, Feb. 03, 2004, Chapter 3, pp. 37-136.

* cited by examiner

*Primary Examiner*—Jean B Jeanglaude
(74) *Attorney, Agent, or Firm*—RatnerPrestia

(57) ABSTRACT

An RFIC controller configured for executing multiple tasks. A serial interface is included having a serial bus for receiving a data stream having control bits and data bits. One or more registers are coupled to the serial bus for storing the control bits and data bits as they are received. Control circuitry is also included. The data stream is formatted such that the control bits are received before the data bits, the control bits specifying an operation. The control circuitry is configured to examine the control bits as they are received to determine the operation specified by the control bits before the data bits are received. A task corresponding to the operation specified by the control bits is then initiated before the data bits are received.

17 Claims, 34 Drawing Sheets

| | | | | | | | | | | | | | | | | | | | | | | | |
|---|---|---|---|---|---|---|---|---|---|---|---|---|---|---|---|---|---|---|---|---|---|---|---|
| PRESCALER VALUE | | POWER-DOWN 2 | POWER-DOWN 1 | CURRENT SETTING 2 | | | | | CURRENT SETTING 1 | | | | | OUTPUT POWER LEVEL | | MUTE-TILL-LD | CP GAIN | CP THREE-STATE | PHASE DETECTOR POLARITY | MUXOUT CONTROL | | | | COUNTER RESET | CORE POWER LEVEL | | CONTROL BITS | |
| DB23 | DB22 | DB21 | DB20 | DB19 | DB18 | DB17 | DB16 | DB15 | DB14 | DB13 | DB12 | DB11 | DB10 | DB9 | DB8 | DB7 | DB6 | DB5 | DB4 | DB3 | DB2 | DB1 | DB0 |
| P2 | P1 | PD2 | PD1 | CP16 | CP15 | CP14 | CP13 | CP12 | CP11 | PL2 | PL1 | MTLD | CPG | CP | PDP | M3 | M2 | M1 | CR | PC2 | PC1 | C2(0) | C1(0) |

CONTROL LATCH

FIG. 3C
PRIOR ART

| MOSI (SERIAL DATA IN) | ID | WE | BNK | T | ADD 4 | ADD 3 | ADD 2 | ADD 1 | ADD 0 | DAT 15 | DAT 14 | DAT 13 | DAT 12 | DAT 11 | DAT 10 | DAT 9 | DAT 8 | DAT 7 | DAT 6 | DAT 5 | DAT 4 | DAT 3 | DAT 2 | DAT 1 | DAT 0 |
|---|---|---|---|---|---|---|---|---|---|---|---|---|---|---|---|---|---|---|---|---|---|---|---|---|---|
| BIT (0=LSB) | - | - | - | - | | | | | | | | | | | | | | | | | | | | | |
| VALUE | X | X | X | 0 | X | X | X | X | X | X | X | X | X | X | X | X | X | X | X | X | X | X | X | X | X |
| | | | | | | | | | | DATA FIELDS | | | | | | | | | | | | | | | |

NORMAL MODE

FIG. 5A

MOSI (SERIAL DATA IN)

EIGHT BIT CONTROL FIELD | DATA FIELDS

| ID | WE | BNK | T | ST | SMC | SMC | SMC | B1 | B1 | B1 | B1 | B1 | B1 | B1 | B1 | B1 | B1 | B1 | B1 | B1 | B1 | B1 | B1 | B0 | B0 | B0 | B0 | B0 | B0 | B0 | B0 | B0 | B0 | B0 | B0 | B0 | B0 | B0 | B0 |
|---|---|---|---|---|---|---|---|---|---|---|---|---|---|---|---|---|---|---|---|---|---|---|---|---|---|---|---|---|---|---|---|---|---|---|---|---|---|---|---|
| BIT (0=LSB) | - | - | - | 3 | 2 | 1 | 0 | 15 | 14 | 13 | 12 | 11 | 10 | 9 | 8 | 7 | 6 | 5 | 4 | 3 | 2 | 1 | 0 | 15 | 14 | 13 | 12 | 11 | 10 | 9 | 8 | 7 | 6 | 5 | 4 | 3 | 2 | 1 | 0 |
| VALUE | X | X | 1 | 0 | X | X | 1 | X | X | X | X | X | X | X | X | X | X | X | X | X | X | X | X | X | X | X | X | X | X | X | X | X | X | X | X | X | X | X | X | X |

40-BIT SPECIAL MODE

FIG. 5B

MOSI (SERIAL DATA IN)

| EIGHT BIT CONTROL FIELD | | | | | | | | DATA FIELDS | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| ID | WE | BNK | T | ST | SMC | SMC | SMC | B2 | B2 | B2 | B2 | B2 | B2 | B2 | B2 | B2 | B2 | B1 | B1 | B1 | B1 | B1 | B1 | B1 | B1 | B1 | B1 | B1 | B1 | B1 | B1 | B1 | B1 | B0 | B0 | B0 | B0 | B0 | B0 | B0 | B0 | B0 | B0 | B0 | B0 | B0 | B0 | B0 | B0 |
| BIT (0=LSB) | - | - | - | - | 3 | 2 | 1 | 0 | 9 | 8 | 7 | 6 | 5 | 4 | 3 | 2 | 1 | 0 | 15 | 14 | 13 | 12 | 11 | 10 | 9 | 8 | 7 | 6 | 5 | 4 | 3 | 2 | 1 | 0 | 15 | 14 | 13 | 12 | 11 | 10 | 9 | 8 | 7 | 6 | 5 | 4 | 3 | 2 | 1 | 0 |
| VALUE | X | X | 1 | 0 | X | X | 0 | 1 | X | X | X | X | X | X | X | X | X | X | X | X | X | X | X | X | X | X | X | X | X | X | X | X | X | X | X | X | X | X | X | X | X | X | X | X | X | X | X | X | X | X |

50-BIT SPECIAL MODE

58-BIT SPECIAL MODE

MOSI (SERIAL DATA IN)

EIGHT BIT CONTROL FIELD

| ID | WE | BNK | T | ST | SR | SR | SR | SR |
|---|---|---|---|---|---|---|---|---|
| BIT (0=LSB) | - | - | - | - | 3 | 2 | 1 | 0 |
| VALUE | X | X | 1 | 1 | X | X | X | X |

8-BIT SPECIAL MODE

FIG. 5E

MISO (SERIAL DATA OUT)

| ID | WE | BNK | T | ADD | ADD | ADD | ADD | ADD | DAT | DAT | DAT | DAT | DAT | DAT | DAT | DAT | DAT | DAT | DAT | DAT | DAT | DAT | DAT | DAT |
|---|---|---|---|---|---|---|---|---|---|---|---|---|---|---|---|---|---|---|---|---|---|---|---|---|
| - | - | - | - | 4 | 3 | 2 | 1 | 0 | 15 | 14 | 13 | 12 | 11 | 10 | 9 | 8 | 7 | 6 | 5 | 4 | 3 | 2 | 1 | 0 |

BIT (0=LSB)

NORMAL MODE

FIG. 6A

MISO (SERIAL DATA OUT)

| ID | WE | BNK | T | ST | SMC | SMC | SMC | B1 B1 B1 B1 B1 B1 B1 B1 B1 B1 B1 B1 B1 B1 B1 B1 | B0 B0 B0 B0 B0 B0 B0 B0 B0 B0 B0 B0 B0 B0 B0 B0 |
|---|---|---|---|---|---|---|---|---|---|
| - | - | - | - | - | SMC | SMC | SMC | 15 14 13 12 11 10 9 8 7 6 5 4 3 2 1 0 | 15 14 13 12 11 10 9 8 7 6 5 4 3 2 1 0 |

BIT (0=LSB)     3   2   1   0

40-BIT SPECIAL MODE

50-BIT SPECIAL MODE

FIG. 6D

58-BIT SPECIAL MODE

MISO (SERIAL DATA OUT)

| ID | WE | BNK | T | ST | SR | SR | SR | SR |
|---|---|---|---|---|---|---|---|---|
| BIT (0=LSB) | - | - | - | - | 3 | 2 | 1 | 0 |

8-BIT SPECIAL MODE

RISA CONTROLLER FOR AN RF INTEGRATED CIRCUIT (RFIC) HAVING IMPROVED EXECUTION SPEED

FIELD OF THE INVENTION

The invention relates, in general, to controlling RF functions in an integrated circuit (IC). More specifically, the present invention relates to an RF system on a chip (RFSoC) that modifies serial streams of data and processes the RF functions with improved speed. For example, the present invention converts serial streams of data into analog voltages for controlling a voltage controlled oscillator (VCO) and, conversely, converts analog voltages from a VCO into serial streams of data.

BACKGROUND

Illustrated in FIG. 1 is a conventional integrated synthesizer and voltage controlled oscillator (VCO) 100 comprising three input terminals: a clock (CLK) input terminal 102a, a serial data (DATA) input terminal 102b, and a load enable (LE) input terminal 102c. An example of an integrated synthesizer and VCO 100 is the ADF4360-0 manufactured by Analog Devices, Inc.

Integrated synthesizer and VCO 100 receives serial data at DATA input terminal 102b and programs one of an R counter latch, an N counter latch, and a control latch. For each rising edge of a clock pulse received at CLK input terminal 102a, synthesizer and VCO 100 shifts a bit received at DATA input terminal 102b into a 24-bit shift register 110. When a signal at LE input terminal 102C transitions from low to high, synthesizer and VCO 100 transfers the data residing in register 110 to a 14-bit R counter 120, an 18-bit N counter 130, or a 24-bit function/control latch 140, depending upon the values of control bits present in the input data stream. Shifting the data to R counter 120 generally corresponds to programming of the R counter latch; shifting the data to N counter 130 generally corresponds to programming of the N counter latch; and shifting the data to function latch 140 generally corresponds to programming of the control latch.

FIG. 2 illustrates a timing diagram 200 of signals present at input terminals 102 of VCO 100. As illustrated, synthesizer and VCO 100 is configured to receive a 24-bit serial data stream 220 at DATA input terminal 102b. Synthesizer and VCO 100 receives the data serially from most significant bit (DB23) first to least significant bit (DB0) last. The two least significant bits (DB0 and DB1) are the control bits (respectively, having values C1 and C2) that determine which of the R counter latch, the N counter latch, or the control latch are programmed by the other bits (DB23 through DB2) of serial data 220. By programming the R and N counter latches, bits DB23 through DB2 are used to control a current (CP) outputted at CP output terminal 106a. FIG. 2 also illustrates timing characteristics of clock signal 210 (received at CLK input terminal 102a) and LE signal 230 (received at LE input terminal 102c).

Referring now to FIG. 3, there are illustrated three formats supported by integrated synthesizer and VCO 100 for the 24-bit data stream received at DATA input terminal 102b. Each of the three formats corresponds to a different function performed by integrated synthesizer and VCO 100. FIG. 3A illustrates the format of the 24-bit data stream 220 for programming the R counter latch; FIG. 3B illustrates the format of the 24-bit data stream 220 for programming the N counter latch; and FIG. 3C illustrates the format of the 24-bit data stream 220 for programming the control latch.

A 24-bit data stream in which control bits (C2,C1)=(0,1) must abide by the format, illustrated in FIG. 3A, for programming the R counter latch. In such a format, data bits DB15 through DB2, having respective values R14 through R1, are used to program 14-bit R counter 120. The 24-bit data stream is clocked into 24-bit data register 110 by clock 210, and, when LE signal 230 goes high, data bits R14 through R1 are sent from 24-bit data register 110 to 14-bit R counter 120. Data bits R14 through R1 specify a division ratio by which the frequency of an $REF_{IN}$ signal present at $REF_{IN}$ input terminal 104a is reduced by 14-bit R counter 120.

A 24-bit data stream in which control bits (C2,C1)=(1,0) must abide by the format, illustrated in FIG. 3B, for programming the N counter latch. In such a format, data bits DB20 through DB8 and DB6 through DB2, having respective values B13 through B1 and A5 through A1, are used to program N counter 130. More specifically, data bits B13 through B1 are used to program 13-bit B counter 139a of N counter 130, and data bits A5 through A1 are used to program 5-bit A counter 139b of N counter 130. The 24-bit data stream is clocked into 24-bit data register 110 by clock 210, and, when LE signal 230 goes high, data bits B13 through B1 are sent to 13-bit B counter 139a and data bits A5 through A1 are sent to 5-bit A counter 139b. Data bits B13 through B1 specify a value "B" used by B counter 139a to reduce the frequency of a $v_n$ signal input to N counter 130. Data bits A5 through A1 specify a value "A" used by A counter 139b to also reduce the frequency of $v_n$.

A 24-bit data stream in which control bits (C2,C1)=(0,0) must abide by the format, illustrated in FIG. 3C, for programming the control latch. In such a format, data bits DB23 and DB22, having respective values P2 and P1, are used to program prescaler 132. The 24-bit data stream is clocked into 24-bit data register 110 by clock 210, and, when LE signal 230 goes high, data bits P2 and P1 are sent to prescaler 132. Data bits P2 and P1 program prescaler 132 by setting a value "P" used by prescaler 132 to reduce the frequency of $v_n$.

As described above, various subcomponents of N counter 130 are used to divide a frequency of a voltage signal $v_n$. Voltage signal $v_n$ is proportional to the difference between complementary voltage signals $v_{OUT1}$ and $v_{OUT2}$ output by VCO core 150. The N counter 130 divides down the frequency of $v_n$ by N=(PB+A). The reduced-frequency signal is applied to output stage 160. As also described above, R counter 120 is used to divide down the frequency of $REF_{IN}$.

The phase of the output signal of R counter 120 is compared to the phase of the output signal of N counter 130 by a phase comparator 160a in output stage 160. The output of phase comparator 160a drives a charge pump 160b which provides, at CP output terminal 106a, current CP which may be applied to an external filter (not illustrated) to set $V_{TUNE}$ at input terminal 106b.

The $V_{TUNE}$ drives VCO core 150 to produce complementary output signals $v_{OUT1}$ and $v_{OUT2}$, wherein $f_{OUT1}$=[(P×B)+A]×$f_{REFIN}$ and $f_{OUT1}$ is spaced in frequency by R (specified by data bits R14 through R1 stored in 14-bit R counter 120). The frequency, $f_{OUT1}$, is the output frequency of VCO core 150; P is the present modulus (e.g., 8/9, 16/17, etc.) of dual-modulus prescaler 132 specified by data bits P2 and P1; B is the preset divide ratio (3 to 8191) of binary 13-bit counter 139a specified by data bits B13 through B1; A is the preset divide ratio (0 to 31) of binary 5-bit swallow counter 139a specified by data bits A5 through A1; and $f_{REFIN}$ is the external reference oscillator frequency of $REF_{IN}$ input at input terminal 104a.

Because control bits (C2,C1) are present at the end of the input serial data stream provided to DATA input terminal 102b, integrated synthesizer and VCO 100 waits to receive the entire 24-bit serial stream before operating on the data present in bits DB23 through DB2. In other words, integrated synthesizer and VCO 100 does not know which of the three latches to program with the 24-bit serial stream entering at DATA input terminal 102*b* before the final two bits (control bits C2 and C1) are received. Thus, a new computation of $f_{OUT_1}$ must wait until all of the bits of 24-bit serial stream have been received. The performance of the integrated synthesizer and VCO 100 is, therefore, reduced.

SUMMARY OF THE INVENTION

In one aspect, an embodiment of the invention comprises a method of executing multiple tasks in an integrated circuit (IC). The method comprises the steps of receiving a data stream, extracting a first portion of bits from the data stream received over a first interval of time, extracting a second portion of bits from the data stream received over a second interval of time, and executing a task using the data bits. The first portion of extracted bits comprises control bits that specify an operation. The second portion of extracted bits comprises data bits corresponding to the operation specified by the control bits. The second interval of time comes after the first interval of time. The task is dependent on the specified operation and it is started after the first interval of time is complete and before the second interval of time is complete.

In another aspect, another embodiment of the invention comprises an RF SoC configured for executing multiple tasks using a serial interface. The serial interface includes a serial data bus for receiving a data stream having control bits and data bits. Also included is one or more registers coupled to the serial data bus for storing the control bits and data bits as they are received. Control circuitry is also included. The data stream is formatted such that the control bits are received before the data bits, the control bits specifying an operation. The control circuitry is configured to examine the control bits as they are received to determine the operation specified by the control bits before the data bits are received. A task corresponding to the operation specified by the control bits is then initiated before the data bits are received.

BRIEF DESCRIPTION OF THE FIGURES

The invention may be understood from the following detailed description when read in connection with the accompanying figures:

FIG. 3C illustrates a format of a serial input signal for programming a control latch of the integrated synthesizer and VCO illustrated in FIG. 1.

FIG. 5A illustrates a bit sequence for a normal-mode serial input data stream, in accordance with an exemplary embodiment of the invention.

FIG. 5B illustrates a bit sequence for a 40-bit special-mode serial input data stream, in accordance with an exemplary embodiment of the invention.

FIG. 5C illustrates a bit sequence for a 50-bit special-mode serial input data stream, in accordance with an exemplary embodiment of the invention.

FIG. 5D illustrates a bit sequence for a 58-bit special-mode serial input data stream, in accordance with an exemplary embodiment of the invention.

FIG. 5E illustrates a bit sequence for an 8-bit special-mode serial input data stream, in accordance with an exemplary embodiment of the invention.

FIG. 6A illustrates a bit sequence for a normal-mode serial output data stream, in accordance with an exemplary embodiment of the invention.

FIG. 6B illustrates a bit sequence for a 40-bit special-mode serial output data stream, in accordance with an exemplary embodiment of the invention.

FIG. 6C illustrates a bit sequence for a 50-bit special-mode serial output data stream, in accordance with an exemplary embodiment of the invention.

FIG. 6D illustrates a bit sequence for a 58-bit special-mode serial output data stream, in accordance with an exemplary embodiment of the invention.

FIG. 6E illustrates a bit sequence for an 8-bit special-mode serial output data stream, in accordance with an exemplary embodiment of the invention.

DETAILED DESCRIPTION

Figure 4:
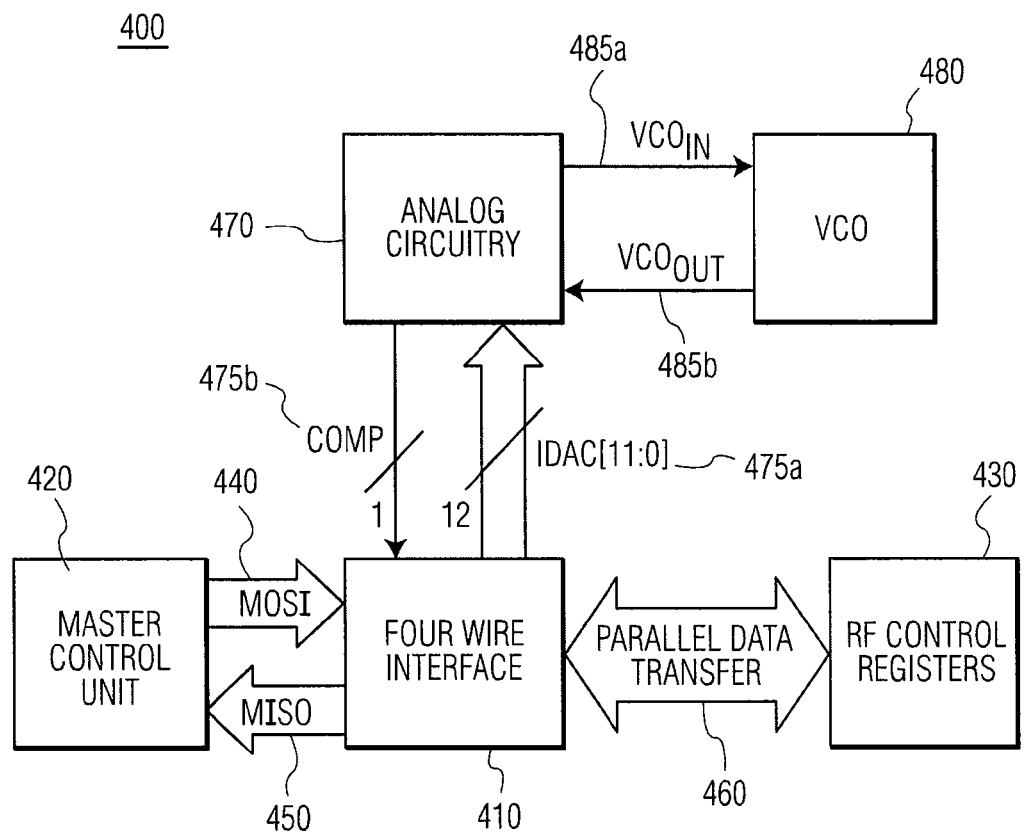
FIG. 4 illustrates a diagram of an RF SoC comprising a controller for an RFIC having improved executing speed, in accordance with an exemplary embodiment of the invention.

Referring to FIG. 4, there is illustrated an RF system on chip (RF SoC) 400, in accordance with an exemplary embodiment of the present invention. RF SoC 400 includes a four-wire interface (herein also "FWI") 410, which is also referred to herein as an "RFIC controller." In one aspect, FWI 410 acts as a serial-to-parallel data converter, accepting input from a master control unit 420 in the form of a variable length serial bit stream and then communicating, in parallel, with internal registers (not illustrated in FIG. 4), external RF control registers 430, and analog circuitry 470. In another aspect, FWI 410 acts as an RFIC controller, receiving serial messages from master control unit 420 and performing analog-to-digital (A/D) conversions and digital-to-analog (D/A) conversions using analog circuitry 470 to control a voltage controlled oscillator (VCO) 480 depending on the serial messages received from master control unit 420.

The serial communications between master control unit 420 and four-wire interface 410 include master-output-serial-input ("MOSI") messages 440 and master-input-serial-output ("MISO") messages 450. MOSI messages 440 are sent from master control unit 420 to FWI 410, and MISO message 450 are sent from FWI 410 to master control unit 420. In an exemplary embodiment described below, MOSI messages 440 have four or eight address bits and differing numbers of data bits. Other embodiments in which four-wire interface 410 may support a number of address bits greater or fewer than four or eight bits are also contemplated.

Communications between FWI 410 and RF control registers 430 occur via parallel data transfer 460. Communications between FWI 410 and analog circuitry 470 occur via data bus 475a, which communicates IDAC[11:0] data in parallel as described below, and via COMP bus 475b, which communicates COMP bits serially as described below. Analog circuitry 470 controls VCO 480 via a $VCO_{IN}$ voltage communicated via communication line 485a. Analog circuitry 470 receives a feedback voltage $VCO_{OUT}$ from VCO 480 via communication line 485b.

MOSI messages 440 include read requests by which master control unit 420 requests a read operation from a register of FWI 410 (or a read operation from an external register located within RF control registers 430) and write requests by which master control unit 420 requests a write operation to a register of FWI 410 (or a write operation to an external register located within RF control registers 430). FWI 410 provides MISO message 450 in response to MOSI message 440.

MOSI messages 440 include control bits and data bits. As will be described, the control bits include a bit that determines whether MOSI messages 440 specify read or write operations and bits that provide address bits. In the case of MOSI message 440 specifying a read operation, the address bits identify a register from which data are read. The data bits in such a message are ignored. In the case of MOSI message 440 specifying a write operation, the address bits identify a register to which the data bits are written.

As will also be discussed in greater detail below, a MOSI message 440 specifying a read operation results in a task being performed. In general, the task performed depends upon the address, specified by the address, bits to be read. A read may result in data being read from the register specified in the address bits or may result in some other task, such as an analog-to-digital conversion (ADC), being performed. The register read from may be located internally in FWI 410 or externally in RF control registers 430.

As will also be discussed in greater detail below, a MOSI message 440 specifying a write operation results in a task being performed. In general, the task performed depends upon the address, specified by the address bits, to be written. A write may result in the data bits of MOSI message 440 being written to the register specified in the address bits or may result in some other task, such as a digital-to-analog conversion (DAC) or a soft reset, being performed. The register written to may be located internally in FWI 410 or externally in RF control registers 430 for later access.

MISO messages 450 also include control bits and data bits. The control bits generally mirror the control bits of MOSI messages 440 and are, therefore, "don't cares." In the case of MISO message 450 responding to a MOSI message 440 specifying a write operation, the data bits of MISO message 450 are the same as the data bits of MOSI message 440. In the case of MISO message 450 responding to MOSI message 440 that specified a read operation, the data bits of MISO message 450 depend upon the data stored in the register addressed by MOSI message 440.

Table 1, shown below, provides various formats of MOSI messages 440 and MISO messages 450 supported by RF SoC 400 and, more specifically, four-wire interface 410:

TABLE 1

| | Transaction Modes | | |
|---|---|---|---|
| Mode | Total Serial Bits | Control Bits | Data Bits |
| Normal | 24 | 8 | 16 |
| Special 40-Bit | 40 | 8 | 32 |
| Special 50-Bit | 50 | 8 | 42 |
| Special 58-Bit | 58 | 8 | 50 |
| Special 8-Bit | 8 | 4 | 4 |

Table 1 illustrates that FWI 410 supports two general modes of operation: a normal mode in which MOSI message 440 or MISO message 450 includes 8 address bits and 16 data bits (for a total of 24 bits) and a special mode in which MOSI message 440 or MISO message 450 includes a total of 40, 50, 58, or 8 bits. In the special mode, MOSI message 440 or MISO message 450 has 8 address bits, except in the 8-bit special mode, in which MOSI message 440 or MISO message 450 has 4 address bits. The total number of data bits in special-mode MOSI message 440 or MISO message 450 varies as shown in Table 1.

Figure 5D:
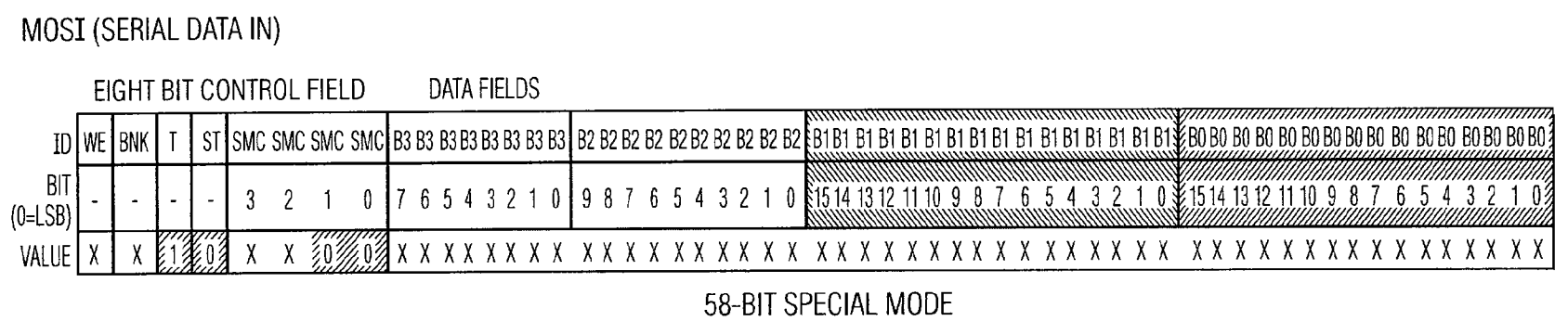

Referring now to FIGS. 5A-5E, there are illustrated bit sequences for the formats of MOSI message 440 provided in Table 1, in accordance with an exemplary embodiment of the present invention. FIG. 5A illustrates the bit sequence for a MOSI serial message 440 formatted for the normal mode of operation; FIGS. 5B-5E, respectively, illustrate bit sequences of MOSI serial messages 440 formatted for the special 40-bit, 50-bit, 58-bit, and 8-bit modes of operation.

In each of the modes of the bit sequences illustrated in FIGS. 5A-5E, the first three most significant bits of the serial message are a "WE" bit, a "BNK" bit, and a "T" bit. The WE bit, i.e., write enable, specifies a read when WE=0 or a write when WE=1, and the BNK bit, i.e., bank, specifies that internal bank 0 is selected for a read or write operation when BNK=0 or that internal bank 1 is selected for a read or write operation when BNK=1. Because the WE and BNK bits have no effect on the mode of a MOSI message, i.e., on whether the mode is normal or special, their bit values are indicated by an "X" in FIG. 5. The T bit, i.e., type, specifies whether the bit sequence conforms to the normal mode or one of the special modes. When T=0, the bit sequence belongs to a normal-mode MOSI message. When T=1, the bit sequence belongs to one of the special-mode MOSI messages.

In special-mode messages, following the T bit is an "ST" bit that determines whether the special mode is the 8-bit special mode or one of the other sub-types of special-mode messages. The ST bit, i.e., sub-type, specifies that the bit sequence belongs to one of the 40-, 50-, or 58-bit special-mode messages when ST=0 or that the bit sequence belongs to an 8-bit special-mode message when ST=1. In the 40-, 50-, and 58-bit special modes, the four bits following the ST bit are SMC bits (SMC[3:0]), the two least significant of which specify the 40-, 50-, or 58-bit special mode to which the bit sequence conforms.

In the case of WE=0, by specifying to which of the 40-, 50-, or 58-bit special mode the bit sequence conforms, SMC[1:0], i.e., special mode control, also specifies from which of internal banked registers B3 through B0 data are to be read. In the case of WE=1, by specifying to which of the 40-, 50-, or 58-bit special mode the bit sequence conforms, SMC[1:0] also specifies to which of internal banked registers B3 through B0 the data bits of the serial message are written.

Table 2 illustrates which values of SMC[1:0] specify which of the non-8-bit special modes and, therefore, which internal bank registers are written to or read from (indicated by an "X") in each of the non-8-bit special modes:

TABLE 2

Non-8-bit Special Mode Selection

| SMC[1:0] | Total Bits | B3 (8 bits) | B2 (10 bits) | B1 (16 bits) | B0 (16 bits) |
|---|---|---|---|---|---|
| 11 or 10 | 40 | — | — | X | X |
| 01 | 50 | — | X | X | X |
| 00 | 58 | X | X | X | X |

As can be seen from Table 2, the non-8-bit special modes specify serial messages of varying lengths. For special-mode MOSI messages 440 specifying a write, the "X" marks indicate to which internal banked registers the data bits of MOSI messages 440 are written. For special-mode MISO messages 450 responsive to a special-mode MOSI read, the "X" marks indicate which internal banked registers provide the contents of the data bits of MISO messages 450.

The 40-bit special mode includes 32 data bits split into two 16-bit words to be written to or read from (depending on WE) internal banked registers B1 and B0; the 50-bit special mode includes 42 data bits split into three words (a 10-bit word and two 16-bit words) to be written to or read from (depending on WE) internal banked registers B2 through B0; and the 58-bit special mode includes 50 data bits split into four words (an 8-bit word, a 10-bit word, and two 16-bit words) to be written to or read from (depending on WE) internal banked registers B3 through B0. Special-mode messages are only used to read from and write to internal banked registers B3 through B0. Except for causing automatic writes to an internal SMC register and to internal temporary registers, special-mode messages are not for reading from or writing to any registers in FWI 410 other than the internal banked registers. Internal banked registers B3 through B0 are mirrored in external banked registers B3 through B0 and are described in more detail below.

In the 8-bit special mode, the four bits following the ST bit are data bits. Thus, a bit sequence belonging to the 8-bit special mode does not include address bits that specify a register to be read from or written to. 8-bit special-mode messages cause FWI 410 to read from and write to an SR register only.

A normal mode message does not have an ST bit. Instead, following the T bit are 5 address bits that specify a register address to be read from or written to. Table 3, shown below, provides a register map of FWI 410 detailing all of the registers addressable by a normal-mode MOSI message 440, i.e., addressable by the 5 address bits of MOSI message 440. Internal banked registers B3 through B0 identified in Table 3 are the same as those identified in Table 2. Thus, a special-mode MOSI message 440 can only read from or write to two or more of the internal banked registers identified in Tables 2 and 3 depending on whether it is a 40-, 50-, or 58-bit special-mode message.

The leftmost column of Table 3 identifies the name of each of the 32 addressable registers. As described below, some of these registers are internal to FWI 410 and some are external. The second column specifies the size, in number of bits, of each register. The third column identifies the address for each register. The fourth column identifies whether the register is meant to be read from (indicated by "R"), written to (indicated by "W"), or either read from or written to (indicated by "R/W"). The rightmost column gives a brief description of each register.

TABLE 3

Register Map

| Name/ID | # of Bits | Address | R/W | Description |
|---|---|---|---|---|
| CTCI | 16 | 0x00 | R/W | Configuration Test Control |
| PDC | 16 | 0x01 | R/W | Power Down Control |
| SCR | 16 | 0x02 | R/W | Scratchpad |
| SRT | 16 | 0x03 | W | Soft Reset |
| B0 | 16 | 0x04 | R/W | Banked 0 |
| B1 | 16 | 0x05 | R/W | Banked 1 |
| B2 | 10 | 0x06 | R/W | Banked 2 |
| B3 | 8 | 0x07 | R/W | Banked 3 |
| ADC0 | 12 | 0x08 | R | Initiates an ADC |
| ADC1 | 12 | 0x09 | R | Initiates an ADC |
| ADC2 | 12 | 0x0A | R | Initiates an ADC |
| ADC3 | 12 | 0x0B | R | Initiates an ADC |
| DAC0 | 12 | 0x0C | R/W | Initiates a DAC |
| DAC1 | 12 | 0x0D | R/W | Initiates a DAC |
| DAC2 | 12 | 0x0E | R/W | Initiates a DAC |
| DAC3 | 12 | 0x0F | R/W | Initiates a DAC |
| EXT10 | 16 | 0x10 | R/W | External (Distributed) Register |
| EXT11 | 16 | 0x11 | R/W | External (Distributed) Register |
| EXT12 | 16 | 0x12 | R/W | External (Distributed) Register |
| EXT13 | 16 | 0x13 | R/W | External (Distributed) Register |
| EXT14 | 16 | 0x14 | R/W | External (Distributed) Register |
| EXT15 | 16 | 0x15 | R/W | External (Distributed) Register |
| EXT16 | 16 | 0x16 | R/W | External (Distributed) Register |
| EXT17 | 16 | 0x17 | R/W | External (Distributed) Register |
| EXT18 | 16 | 0x18 | R/W | External (Distributed) Register |
| EXT19 | 16 | 0x19 | R/W | External (Distributed) Register |

TABLE 3-continued

Register Map

| Name/ID | # of Bits | Address | R/W | Description |
|---------|-----------|---------|-----|-------------|
| EXT1A | 16 | 0x1A | R/W | External (Distributed) Register |
| EXT1B | 16 | 0x1B | R/W | External (Distributed) Register |
| EXT1C | 16 | 0x1C | R/W | External (Distributed) Register |
| EXT1D | 16 | 0x1D | R/W | External (Distributed) Register |
| EXT1E | 16 | 0x1E | R/W | External (Distributed) Register |
| CID | 16 | 0x1F | R | Chip ID |

Figure 6C:
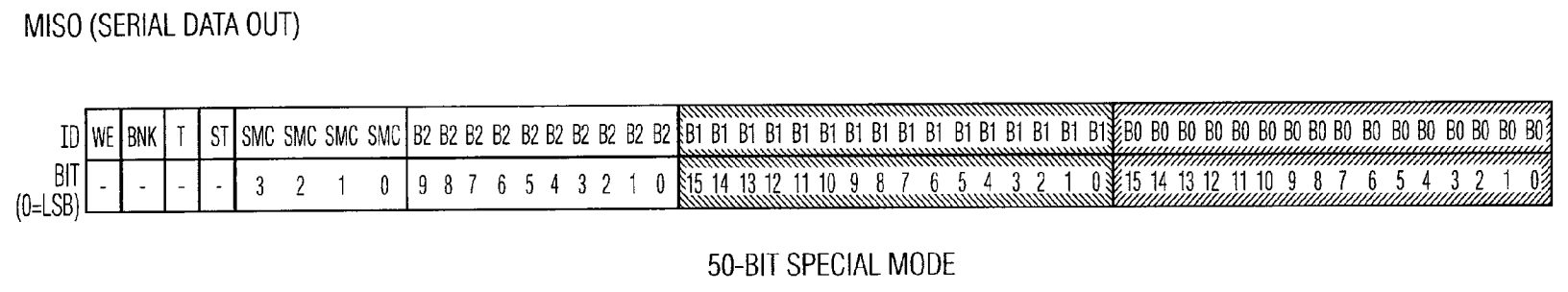
Figure 6D:
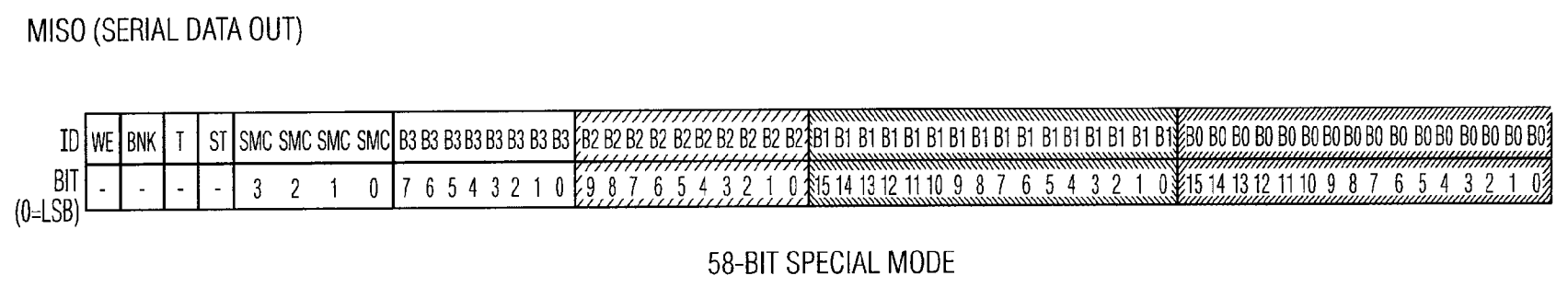

Referring now to FIGS. 6A-6E, there are illustrated the bit sequences for the formats of MISO message 450 provided in Table 1, in accordance with an exemplary embodiment of the present invention. FIG. 6A illustrates the bit sequence for a MISO serial message 450 formatted for the normal mode of operation; FIGS. 6B-6E respectively illustrate the bit sequences of MISO serial messages 450 formatted for the special 40-bit, the 50-bit, the 58-bit, and the 8-bit modes of operation.

As described above, MISO message 450 is provided by FWI 410 in response to MOSI message 440. The control bits of MISO message 450 mirror the control bits of MOSI message 440. The data bits of MISO message 450 depend upon whether MOSI message 440 specified a read or write and, if it specified a write, what register it wrote to. The following table details the data bits of MISO messages 450 that are responsive to MOSI messages 440 specifying reads from or writes to the registers identified in Table 3:

TABLE 4

MISO data

| Reg. Name | Reg. Address | MISO data if WE = 0 | MISO data if WE = 1 |
|-----------|--------------|---------------------|---------------------|
| CTCI | 0x00 | Register Current Value | MOSI Data |
| PDC | 0x01 | Register Current Value | MOSI Data |
| SCR | 0x02 | Register Current Value | MOSI Data |
| SRT | 0x03 | Don't Care | MOSI Data |
| B0 | 0x04 | Register Current Value | MOSI Data |
| B1 | 0x05 | Register Current Value | MOSI Data |
| B2 | 0x06 | Register Current Value | MOSI Data |
| B3 | 0x07 | Register Current Value | MOSI Data |
| ADC0 | 0x08 | ADC 0 Conversion | MOSI Data |
| ADC1 | 0x09 | ADC 1 Conversion | MOSI Data |
| ADC2 | 0x0A | ADC 2 Conversion | MOSI Data |
| ADC3 | 0x0B | ADC 3 Conversion | MOSI Data |
| DAC0 | 0x0C | IDAC [11:0] Current Value | MOSI Data |
| DAC1 | 0x0D | IDAC [11:0] Current Value | MOSI Data |
| DAC2 | 0x0E | IDAC [11:0] Current Value | MOSI Data |
| DAC3 | 0x0F | IDAC [11:0] Current Value | MOSI Data |
| EXT10-EXT1E | 0x10-0x1E | Register Current Value | MOSI Data |
| CID | 0x1F | Chip ID | MOSI Data |

If MOSI message 440 specified a write, then the data bits of the responsive MISO message 450 are the same as the MOSI message 440 data bits. If MOSI message 440 specified a read, then the data bits of the responsive MISO message 450 depend upon the address specified by MOSI message 440. For MOSI messages 440 specifying a read from addresses 0x00-0x02, 0x04-0x07, and 0x10-0x1E, the data bits of each MISO message 450 include the values of the register specified by the read request. For MOSI messages 440 specifying a read from addresses 0x08-0x0B, the data bits of each MISO message 450 include the values of a digitized analog signal. For MOSI messages 440 specifying a read from addresses 0x0C-0x0F, the data bits of each MISO message 450 include IDAC [11:0] values (described in more detail below). A MISO message 450 responsive to a read from 0x03 is a "don't care," and a MISO message 450 responsive to a read from 0x1F includes a chip ID.

Figure 7:
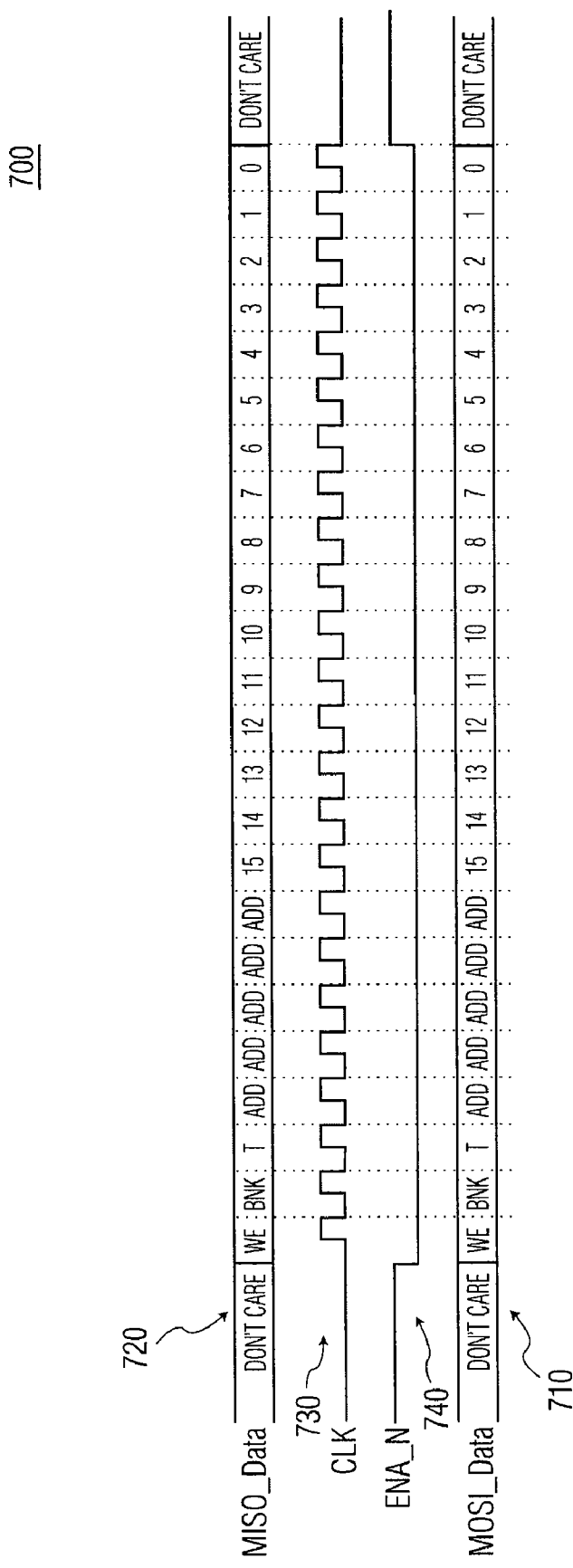
FIG. 7 illustrates a timing diagram of input and output signals of the RFIC controller illustrated in FIG. 4, in accordance with an exemplary embodiment of the invention.

Referring now to FIG. 7, there is illustrated a timing diagram 700 of a MOSI input message 710 (also designated as "MOSI_Data" in FIG. 7) and a MISO output message 720 (also designated as "MISO_Data" in FIG. 7) of four-wire interface 410, in accordance with an exemplary embodiment of the present invention. MOSI input message 710 and MISO output message 720 are further embodiments, respectively, of MOSI message 440 and MISO message 450 formatted according to the normal mode.

As illustrated, data bits of MOSI message 710 are only clocked in and data bits of MISO message 720 are only clocked out when enable control 740 (also designated as "ENA_N" in FIG. 7) is low. Additionally, data in MOSI message 710 is synchronized to the falling edge of the clock 730 (also designated as "CLK" in FIG. 7), i.e., it is clocked into FWI 410 on the falling edge of pulses of clock 730. Data in MISO message 720 is also synchronized to the falling edge of clock 730, i.e., it is clocked out of FWI 410 on the falling edge of pulses of clock 730. Although FIG. 7 illustrates MOSI message 710 and MISO message 720 as having the normal format, it is understood that MOSI messages and MISO messages of any format are, respectively, clocked in and clocked out in the manner of MOSI message 710 and MISO message 720.

Figure 8:
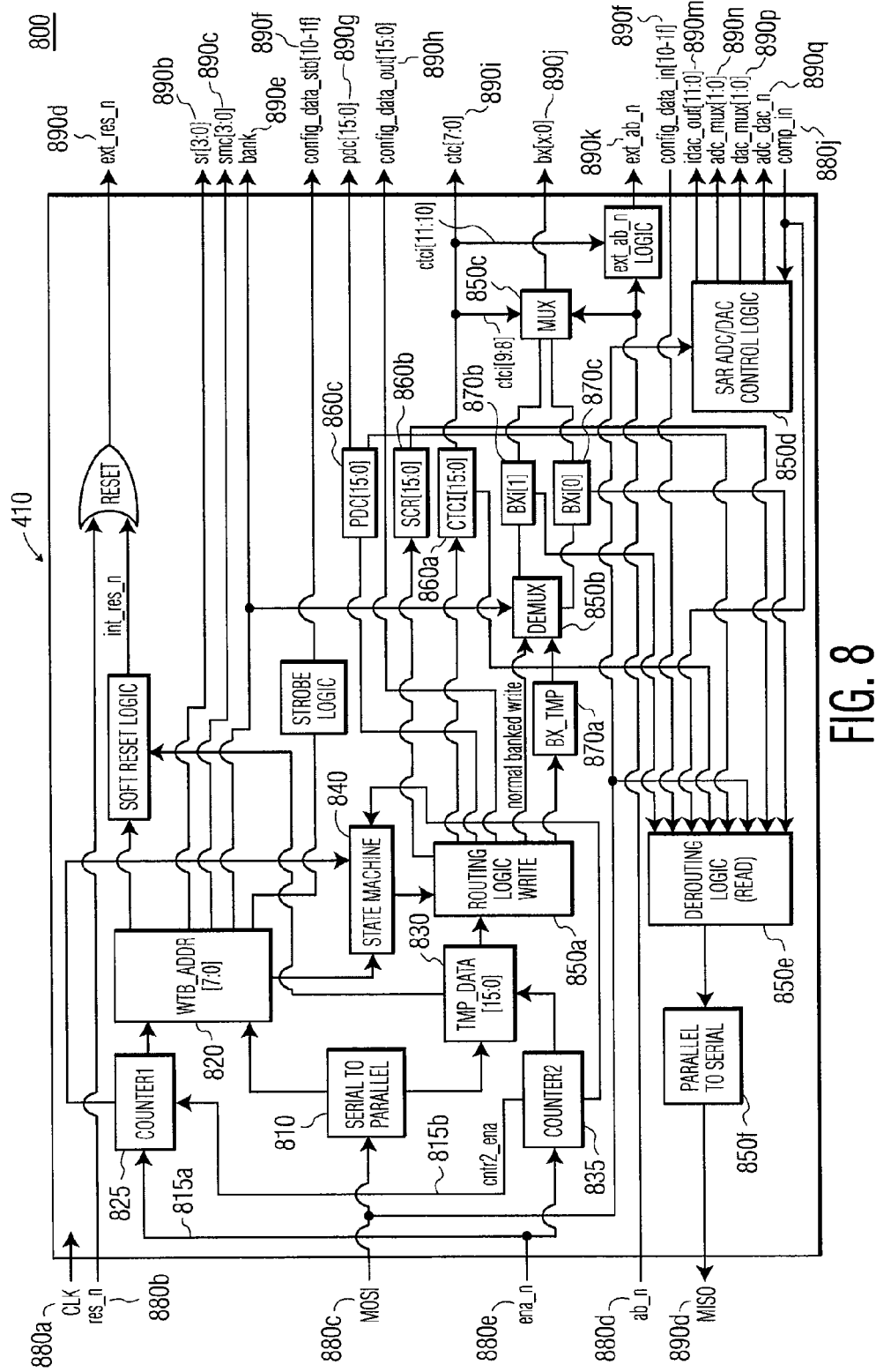
FIG. 8 illustrates input interfaces, output interfaces, and internal components of the RFIC controller illustrated in FIG. 4, in accordance with an exemplary embodiment of the invention.

Turning now to FIG. 8, there is illustrated a detailed diagram 800 of FWI 410, its internal components, its input terminals and bus interfaces 880, and its output terminals and bus interfaces 890, in accordance with an exemplary embodiment of the present invention. FWI 410 includes a number of internal registers 860 and 870 and interfaces 890 to external registers (not illustrated) located in RF control registers 430. Internal registers 860 and 870 and the external registers are read from and written to according to MOSI messages 440 received via mosi input terminal 880c. MISO message 450 are outputted via miso output terminal 890d depending on the operation specified by MOSI message 440.

With reference to diagram 800 and Table 3, internal register 860a is the CTCI register at address 0x00, and register 860b is the SCR register at address 0x02. The use of CTCI register 860a and the SCR register depends upon the implementation of master control unit 420. FWI 410 mirrors the lower byte of CTCI register 860a to an external CTC register via output bus interface 890i. The ab_n signal inputted at input terminal 880d and the ext_ab_n signal outputted at output terminal 890k are also involved with CTCI register 860a operations. CTCI register 860a, the CTC register, the ab_n signal, and the ext_ab_n signal are described in more detail below with respect to FIG. 11A and Table 6. Internal register 860c is the PDC register at address 0x01. PDC register 860c is the power down control for FWI 410. FWI 410 mirrors the values of PDC register 860c to an external PDC register (not illustrated) via output bus interface 890g.

The SRT register at address 0x03 is a write-only register that, when written to, soft resets all internal and external registers to their default values. The SRT register does not actually store data; instead, it specifies a task (a soft reset) that is performed when FWI 410 receives a MOSI message 440 specifying a particular write operation, e.g., a write of data 0xAA55 to address 0x03.

Internal resets of FWI 410 can occur by activation of either the res_n signal input at input terminal 880b or the int_res_n signal. The res_n signal is an external reset controlled by master controller unit 420. It is active low. The int_res_n signal is an internal soft reset that is controlled by the SRT register. After data 0xAA55 is written to address 0x03 (the soft reset address), on the rising edge of ena_n, int_res_n goes active and resets all of the registers of FWI 410. It becomes inactive when ena_n returns low. No subsequent write to 0x03 is required to deactivate the reset condition. The ext_res_n signal outputted at output terminal 890a is the product of ORing the res_n and int_res_n signals.

The ADCX registers (i.e., registers ADC3 through ADC0 at respective addresses 0x08 through 0x0B) and DACX registers (i.e., registers DAC3 through DAC0 at respective addresses 0x0C through 0x0F) identified in Table 3 do not store data bits of MOSI message 440 for later access. Instead, read or write operations involving these registers cause certain tasks to be performed by FWI 410.

The ADC0 through ADC3 registers are read-only registers that, when read from, initiate an analog-to-digital conversion of an analog signal specified by the ADCX address (0x08 through 0x0B). An A/D conversion results in a MISO message 450 output at terminal 890d having data bits that comprise the digital representation of the converted analog signal. A write to one of ADC0 through ADC3 registers by a MOSI message 440 results in a MISO message 450 having data bits that comprise the MOSI message 440 data bits. An idac_out[11:0] output bus interface 890m, an adc_mux[1:0] output bus interface 890n, an adc_dac_n output terminal 890q, and a comp_in input terminal 880j are used in analog-to-digital operations. They are described in more detail below with reference to FIGS. 13 and 14B.

The DAC0 through DAC3 registers are read/write registers. A MOSI message 440 specifying a write to one of registers DAC3 through DAC0 initiates a digital-to-analog conversion at the written-to register using the data supplied in MOSI message 440. A D/A conversion results in a MISO message 450 output at terminal 890d having data bits that comprise the data bits of the MOSI message 440 specifying the D/A conversion. A read from one of registers DAC0 through DAC3 registers by a MOSI message 440 results in a MISO message 450 having data bits that comprise the current values of IDAC[11:0] which are provided at idac_out[11:0] bus interface 890m. The IDAC[11:0] values provided at idac_out[11:0] output bus interface 890m, a dac_mux[1:0] output bus interface 890p, the adc_dac_n output terminal 890q, and digital-to-analog operations are described in more detail below with reference to FIGS. 13 and 14A.

Register 870b (also designated as "BXi[1]" in FIG. 8) and register 870c (also designated as "BXi[0]" in FIG. 8) are the internal banked registers at addresses 0x04-0x07. They may be read from or written to by either normal-mode MOSI messages or special-mode MOSI messages. Internal temporary register 870a (also designated as "BX_TMP" in FIG. 8) in conjunction with demultiplexer 850b and multiplexer 850c are involved with special-mode write operations to the internal banked registers. Special-mode write operations are described in more detail below with respect to FIG. 12.

FWI 410 mirrors the contents of internal banked registers 870b and 870c at output bus interface 890j for external banked registers B4 through B0 (BX[X:0]). The bank output terminal 890e outputs the BNK bit of MOSI message 440 received at mosi input terminal 880c.

Input bus interface 880f is the interface to a 16-bit input bus by which FWI 410 receives data responsive to read operations for external registers EXT10 through EXT1E (corresponding to addresses 0x10 through 0x1E) and external register CID (corresponding to address 0x1F). Output bus interface 890h is the interface to a 16-bit bus by which FWI 410 sends data pursuant to a write operation to external registers EXT10 through EXT1E. The use of EXT10 through EXT1E registers depends upon the implementation of RF SoC 400 and, more specifically, master control unit 420.

In an exemplary embodiment, writes to external registers (writes to addresses 0x10 through 0x1E corresponding, respectively, to external registers EXT10 through EXT1E) are handled in a unique manner. In such an embodiment, these registers require a "write strobe" to accompany the data, essentially acting as the clock for these external registers. In order to ensure there is appropriate setup time for the data, data is loaded on the last rising clock edge of the message to config_data_out[15:0] bus interface 890h, and the strobe is activated synchronously with the rising edge of ena_n, yielding a half clock (25 ns) setup time. The strobe resets back to zero on the next subsequent rising clock edge. The strobe is present on the config_data_stb[10-1F] output bus interface 890f corresponding to the external register (EXT10-EXT1E) written to. For example, if external register 0x1B is written to, config_data_stb[1B] carries the strobe.

The SR, i.e., short register, register (not illustrated in FIG. 8) is an internal register of FWI 410 that mirrors its contents at bus interface 890b. The SMC, i.e., special mode control, register (not illustrated in FIG. 8) is an internal register of FWI 410 that provides its contents at bus interface 890c. The SR register is only written with the data of an 8-bit special-mode MOSI message that specifies a write, and the SMC register is only written to as a result of FWI 410 receiving a variable-length special-mode MOSI message that specifies a read or write. More specifically, in the case of FWI 410 receiving a variable-length special-mode MOSI message, the 4 least significant control bits (SMC[3:0]) of such message are stored in the SMC register and mirrored at smc[3:0] output bus interface 890c. Writing to the SR register is described in more detail below with regard to FIG. 1C.

Table 5 provided below details the inputs 880 and outputs 890 of FWI 410:

TABLE 5

| Signal Name | Ref. # | # of Bits | I/O | Clocked By | Description |
| --- | --- | --- | --- | --- | --- |
| clk | 880a | 1 | I | n/a | main clock from master control unit clk is only active while ena_n is active (not controlled by FWI 410) |
| res_n | 880b | 1 | I | asynchronous | asynchronous reset (active low) 0: issues a reset from off chip. All registers remain in their reset condition until this signal is driven back to 1 |

TABLE 5-continued

I/O

| Signal Name | Ref. # | # of Bits | I/O | Clocked By | Description |
|---|---|---|---|---|---|
| mosi | 880c | 1 | I | n/a | master output slave input serial data from master to slave (incoming serial bit stream to FWI 410 synchronized to falling edge of clk) |
| ab_n | 880d | 1 | I | asynchronous | determines which array is fed from BXi to BX if CTCI [8] = 1, also drives ext_ab_n if CTCI [10] = 1<br>ab_n = 0 & CTCI [8] = 1: BXi[0] => BX<br>ab_n = 1 & CTCI [8] = 1: BXi[1] => BX<br>ab_n = 0 & CTCI [10] = 1: ext_ab_n = 0<br>ab_n = 1 & CTCI [10] = 1: ext_ab_n = 1 |
| ena_n | 880e | 1 | I | n/a | enable (active low)<br>0: indicates a message is being transmitted or received<br>1: idle condition<br>Also, the rising edge of ena_n is used as the reset trigger for count1, cntr2_en, and count2, as well as the trigger for a soft reset and strobe activation. |
| config_data_in_10h [15:0] | 880f | 16 | I | clk | 16-Bit data, read lines from external register at address 0x10 |
| config_data_in_11h [15:0] | 880f | 16 | I | clk | 16-Bit data, read lines from external register at address 0x11 |
| config_data_in_12h [15:0] | 880f | 16 | I | clk | 16-Bit data, read lines from external register at address 0x12 |
| config_data_in_13h [15:0] | 880f | 16 | I | clk | 16-Bit data, read lines from external register at address 0x13 |
| config_data_in_14h [15:0] | 880f | 16 | I | clk | 16-Bit data, read lines from external register at address 0x14 |
| config_data_in_15h [15:0] | 880f | 16 | I | clk | 16-Bit data, read lines from external register at address 0x15 |
| config_data_in_16h [15:0] | 880f | 16 | I | clk | 16-Bit data, read lines from external register at address 0x16 |
| config_data_in_17h [15:0] | 880f | 16 | I | clk | 16-Bit data, read lines from external register at address 0x17 |
| config_data_in_18h [15:0] | 880f | 16 | I | clk | 16-Bit data, read lines from external register at address 0x18 |
| config_data_in_19h [15:0] | 880f | 16 | I | clk | 16-Bit data, read lines from external register at address 0x19 |
| config_data_in_1ah [15:0] | 880f | 16 | I | clk | 16-Bit data, read lines from external register at address 0x1A |
| config_data_in_1bh [15:0] | 880f | 16 | I | clk | 16-Bit data, read lines from external register at address 0x1B |
| config_data_in_1ch [15:0] | 880f | 16 | I | clk | 16-Bit data, read lines from external register at address 0x1D |
| config_data_in_1dh [15:0] | 880f | 16 | I | clk | 16-Bit data, read lines from external register at address 0x1D |
| config_data_in_1eh [15:0] | 880f | 16 | I | clk | 16-Bit data, read lines from external register at address 0x1E |
| config_data_in_1fh [15:0] | 880f | 16 | I | clk | chip ID |
| comp_in | 880j | 1 | I | clk | comparator sets this bit according to the conversion process taking place |
| ext_res_n | 890a | 1 | O | asynchronous | asynchronous reset (active low)<br>0: indicates that either hard reset (res_n) is active or the soft reset condition has been met and is active<br>1: reset conditions do not exist |
| sr[3:0] | 890b | 4 | O | clk | Short Register, 4-Bit data significant to RF control |
| smc[3:0] | 890c | 4 | O | clk | Special Mode Control, 4-Bit data significant to RF control |
| miso | 890d | 1 | O | clk | Serial data from slave to master. During a write operation (we = 1) mosi is piped back out on this output. During a read operation (we = 0) the contents of whatever register specified in the address is sent out serially, MSB first. |
| bank | 890e | 1 | O | asynchronous | 0: indicates bank 0 is selected for a read or write operation.<br>1: indicates bank 1 is selected for a read or write operation |
| config_data_stb_10h | 890f | 1 | O | rising edge ena_n | strobe signal for external address 0x10 |
| config_data_stb_11h | 890f | 1 | O | rising edge ena_n | strobe signal for external address 0x11 |
| config_data_stb_12h | 890f | 1 | O | rising edge ena_n | strobe signal for external address 0x12 |

TABLE 5-continued

I/O

Figure 11A:
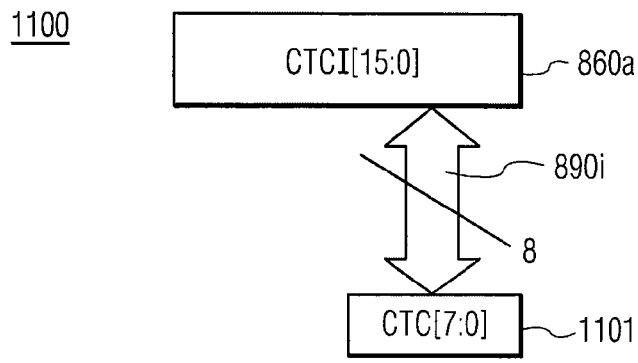
FIG. 11A illustrates a relationship between a CTCI register internal to the RFIC controller and a CTC register external to the RFIC controller, in accordance with an exemplary embodiment of the invention.

| Signal Name | Ref. # | # of Bits | I/O | Clocked By | Description |
|---|---|---|---|---|---|
| config_data_stb_13h | 890f | 1 | O | rising edge ena_n | strobe signal for external address 0x13 |
| config_data_stb_14h | 890f | 1 | O | rising edge ena_n | strobe signal for external address 0x14 |
| config_data_stb_15h | 890f | 1 | O | rising edge ena_n | strobe signal for external address 0x15 |
| config_data_stb_16h | 890f | 1 | O | rising edge ena_n | strobe signal for external address 0x16 |
| config_data_stb_17h | 890f | 1 | O | rising edge ena_n | strobe signal for external address 0x17 |
| config_data_stb_18h | 890f | 1 | O | rising edge ena_n | strobe signal for external address 0x18 |
| config_data_stb_19h | 890f | 1 | O | rising edge ena_n | strobe signal for external address 0x19 |
| config_data_stb_1ah | 890f | 1 | O | rising edge ena_n | strobe signal for external address 0x1A |
| config_data_stb_1bh | 890f | 1 | O | rising edge ena_n | strobe signal for external address 0x1B |
| config_data_stb_1ch | 890f | 1 | O | rising edge ena_n | strobe signal for external address 0x1C |
| config_data_stb_1dh | 890f | 1 | O | rising edge ena_n | strobe signal for external address 0x1D |
| config_data_stb_1eh | 890f | 1 | O | rising edge ena_n | strobe signal for external address 0x1E |
| pdc[15:0] | 890g | 16 | O | clk | Power Down Control, 16-Bit data significant to RF control |
| config_data_out [15:0] | 890h | 16 | O | clk | This output is fanned out to all inputs of registers that are clocked by configdata_stb_1xh |
| ctc[7:0] | 890i | 8 | O | clk | configuration test control register fed from bits [7:0] of CTCI see FIG. 11A |
| B0[15:0] | 890j | 16 | O | asynchronous | 16-Bit banked data, significant to RF control |
| B1[15:0] | 890j | 16 | O | asynchronous | 16-Bit banked data, significant to RF control |
| B2[9:0] | 890j | 10 | O | asynchronous | 10-Bit banked data, significant to RF control |
| B3[7:0] | 890j | 8 | o | asynchronous | 8-Bit banked data, significant to RF control |
| ext_ab_n | 890k | 1 | o | asynchronous | if CTCI[10] = 1: ext_ab_n = ab_n if CTCI[10] = 0: ext_ab_n = CTCI[11] |
| idac_out[11:0] | 890m | 12 | O | clk | these bits are set during the ADC and DAC processes. See FIG. 13 |
| adc_mux[1:0] | 890n | 2 | O | clk | controls a mux outside of the FWI used for the ADC process 00: read from addr 0x08 01: read from addr 0x09 10: read from addr 0x0A 11: read from addr 0x0B See FIG. 13 |
| dac_mux[1:0] | 890p | 2 | O | clk | controls a mux outside of the FWI used for the DAC process 00: write to addr 0x0C 01: write to addr 0x0D 10: write to addr 0x0E 11: write to addr 0x0F See FIG. 13 |
| adc_dac_n | 890q | 1 | O | clk | controls a mux outside of the FWI used for ADC DAC processes 0: DAC process 1: ADC process See FIG. 13 |

FWI 410 receives MOSI message 440 at mosi input terminal 880c. Serial to parallel circuitry 810 directs the bits of MOSI message 440 to either a register 820 or a register 830 under control of a state machine 840. For non-8-bit special-mode MOSI messages, FWI 410 directs the control bits of MOSI message 440 to register 820 and the address bits of MOSI message 440 to register 830 under the watch state machine 840. For non-8-bit special-mode MOSI messages, register 820 stores the control bits of MOSI message 440 as register bits WTB_ADDR[7:0], and register 830 temporarily stores the data bits of MOSI message 440 as register bits temp_data[15:0]. For 8-bit special-mode MOSI messages, FWI 410 directs all bits of MOSI message 440 to register 820 which stores the control bits and data bits as register bits WTB_ADDR[7:0].

An enable control 815a (the ena_n signal) received at input terminal 880e controls whether FWI 410 is enabled to receive MOSI message 440. Enable control 815a is active low, so that bits of MOSI message 440 are clocked in to either register 820 or register 830 when ena_n=0. Enable control 815a also controls whether counters 825 and 835 are active and counting. Counter 825 increments a count (count1) when enable control 815a is active, i.e., when ena_n=0. Counter 835 increments a count (count2) when at least an enable control 825a and enable control 815a are active. Enable control 825a is activated when the count maintained by counter 825 indicates that the last bit of register 820 has been filled. Enable control 825a is active low, so that counter 835 may only increment when cntr2_en=0.

Figure 9:
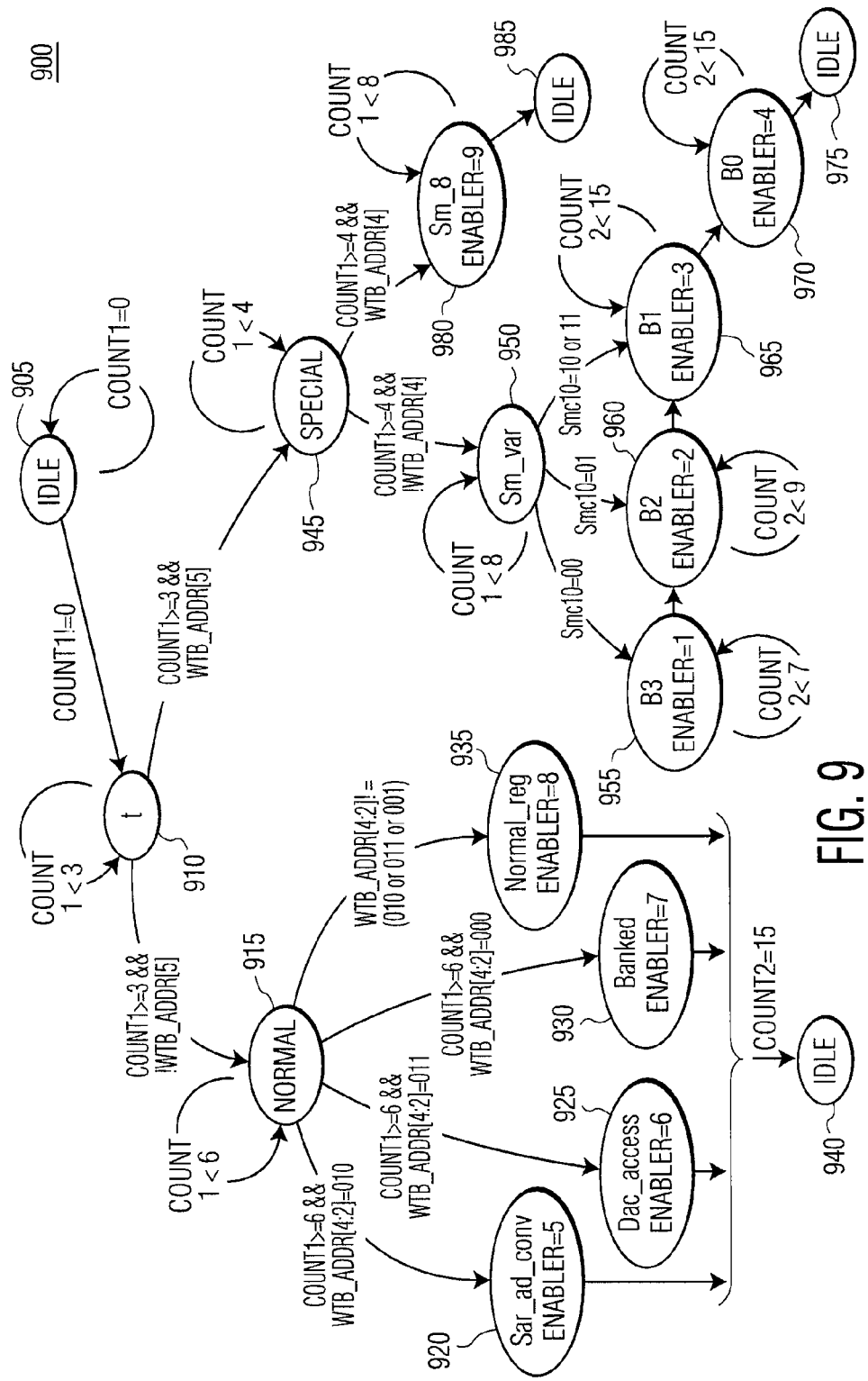
FIG. 9 illustrates a diagram of a state machine of the RFIC controller illustrated in FIG. 4, in accordance with an exemplary embodiment of the invention.

Illustrated in FIG. 9 is a state diagram 900 detailing the states of state machine 840. A detailed description of the control logic of state machine 840 over the receiving and processing of MOSI message 440 in FWI 410 is now described with reference to FIG. 9.

In state 905, MOSI message 440 is not being received by FWI 410 and enable control 815a is inactive. Count1 maintained by counter 825 is 0. Starting with a transition of enable control 815a to active, on the first rising edge of the clock, the first bit of MOSI message 440 is clocked to WTB_ADDR[7] of register 820 and counter 825 increments so that count1=1. Seeing that count1=1, state machine 840 transitions to state 910. In state 910, state machine 840 comes out of the idle state as it knows that MOSI data is being received via mosi input terminal 880c. State machine 840 comes out of idle to wait, in state 910, for count1 to equal 3, which indicates WTB_ADDR[5] has been loaded and is ready to be read.

In state 910, on the next rising clock edge, the next bit of MOSI message 440 is clocked to WTB_ADDR[6] of register 820 and counter 825 increments so that count1=2. On the next rising clock edge, the next bit of MOSI message 440 is clocked to WTB_ADDR[5] and counter 825 increments so that count1=3. State machine 840, realizing that count1=3, then reads WTB_ADDR[5]. The WTB_ADDR[5] bit specifies the message type of MOSI message 440. If WTB_ADDR[5]=1 (and count1>=3), state machine 840 determines that the message is of the special type and changes to state 945. Otherwise, if WTB_ADDR[5]=0 (and count1>=3), state machine 840 determines that the message is of the normal type and changes to state 915.

In state 915, the next three bits (ADD4 through ADD2) of MOSI message 440 are clocked into register 820 as WTB_ADDR[4:2] and are examined by state machine 840. Counter 825 increments so that count1=6. State machine 840, realizing that count1=6, the reads WTB_ADDR[4:2]. If WTB_ADDR[4:2]=010 (and count1>=6), state machine 840 determines that MOSI message 440 specifies an analog-to-digital conversion (though is unable to determine which ADC register until ADD1 and ADD0 are received) and changes to state 920. If WTB_ADDR[4:2]=011 (and count1>=6), state machine 840 determines that MOSI message 440 specifies a digital-to-analog conversion (though is unable to determine which DAC register until ADD1 and ADD0 are received) and changes to state 925. If WTB_ADDR[4:2]=000 (and count1>=6), state machine 840 determines that MOSI message 440 specifies an operation to one of the bank registers (though is unable to determine which bank register until ADD1 and ADD0 are received) and changes to state 930. Otherwise, state machine changes to state 935.

Figure 14A:
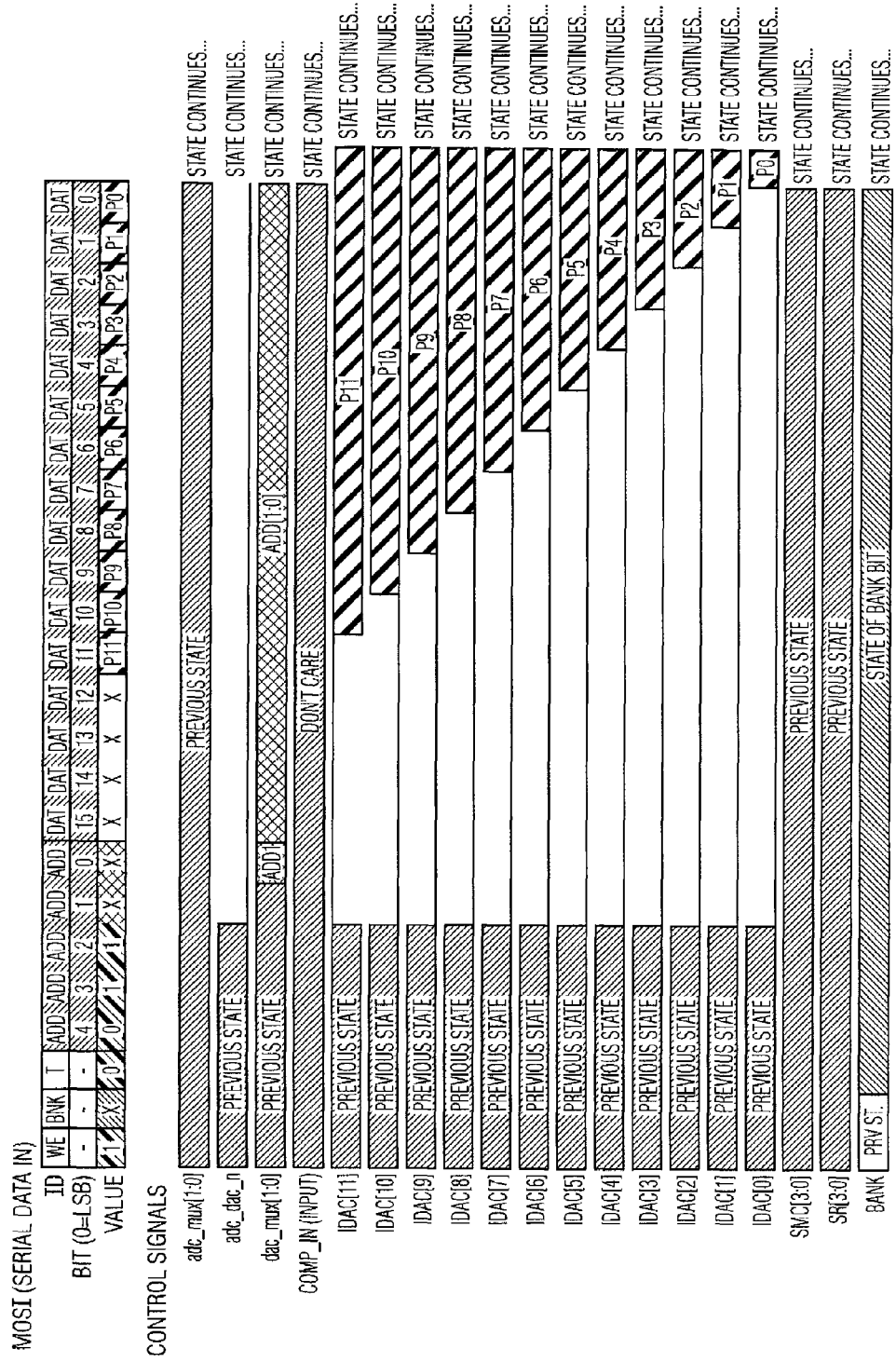
FIG. 14A illustrates timing requirements for a digital-to-analog conversion, in accordance with an exemplary embodiment of the invention.

In state 920, state machine 840 activates enable control 825a and causes FWI 410 to set adc_dac_n=1, IDAC[11]=1, and IDAC[10:0]=0. Activating enable control 825 causes counter 835 to increment count2 as the data bits of MOSI message 440 are clocked into register 830. As the data bits of MOSI message 440 are clocked in (they are ignored), FWI 410 performs the A/D conversion on the analog signal specified by the address bits of MOSI message 440. Counter 835 increments count2 until count2=16, at which point all of the data of MOSI message 440 have been clocked into register 830 and the A/D conversion should be complete. State machine 840 then changes to state 940 in which it goes idle until the next MOSI message is received. FIG. 14A, described below, illustrates a timing diagram of various aspects of an A/D conversion.

In state 925, state machine 840 activates enable control 825a and causes FWI 410 to set adc_dac_n=0, IDAC[11]=1, and IDAC[10:0]=0. Activating enable control 825 causes counter 835 to increment count2 as the data bits of MOSI message 440 are clocked into register 830. As the data bits of MOSI message 440 are clocked in, FWI 410 performs the D/A conversion on the clocked-in data bits as they are received. Counter 835 increments count2 until count2=16, at which point all of the data of MOSI message 440 have been clocked into register 830. The D/A conversion should be complete within a period of time equal to one clock cycle after the least significant bit of MOSI message 440 is clocked into register 830. State machine 840 then changes to state 940 in which it goes idle until the next MOSI message is received.

In states 930 and 935, state machine 840 activates enable control 825a. Activating enable control 825 causes counter 835 to increment count2 as the data bits of MOSI message 440 are clocked into register 830. For read requests, as the data are clocked in, FWI 410 reads from the specified register. Otherwise, for write requests, it waits until all data are received before writing to the specified register. Counter 835 increments count2 until count2=16, at which point all of the data of MOSI message 440 have been clocked into register 830. State machine 840 then changes to state 940 in which it goes idle until the next MOSI message is received.

In state 945, the next bit (ST) of MOSI message 440 is clocked into register 820 as WTB_ADDR[4] and is examined by state machine 840. Counter 825 increments so that count1=4. State machine 840, realizing that count1=4, then reads WTB_ADDR[4]. The WTB_ADDR[4] bit specifies the sub-type of MOSI message 440. If WTB_ADDR[4]=1 (and count1=4), state machine 840 determines that MOSI message 440 is an 8-bit special message and changes to state 980. Otherwise, if WTB_ADDR[4]=0 (and count1=4), state machine 840 determines that the message is a non-8-bit special message and changes to state 950.

In state 950, the next four bits (SMC3 through SMC0) of MOSI message 440 are clocked into register 820 as WTB_ADDR[3:0] and are examined by state machine 840. Counter 825 increments so that count1=8. If WTB_ADDR[1:0]=[0,0], state machine 840 determines that MOSI message 440 specifies a 58-bit special message and changes to state 955. If WTB_ADDR[1:0]=[0,1], state machine 840 determines that MOSI message 440 specifies a 50-bit special message and changes to state 960. Otherwise, if WTB_ADDR[1]=1, state machine 840 determines that MOSI message 440 specifies a 40-bit special message and changes to state 965.

In state 955, state machine 840 activates enable control 825a. Activating enable control 825 causes counter 835 to increment count2 as the data bits of MOSI message 440 are clocked into register 830. Counter 835 increments count2 until count2=8, at which point all of the B3 data of MOSI message 440 have been clocked into register 830. State machine 840 then resets count2 and changes to state 960.

In state 960, state machine 840 activates enable control 825a. Activating enable control 825 causes counter 835 to increment count2 as the data bits of MOSI message 440 are clocked into register 830. Counter 835 increments count2 until count2=10, at which point all of the B2 data of MOSI message 440 have been clocked into register 830. State machine 840 then resets count2 and changes to state 965.

In state 965, state machine 840 activates enable control 825a. Activating enable control 825 causes counter 835 to increment count2 as the data bits of MOSI message 440 are clocked into register 830. Counter 835 increments count2 until count2=16, at which point all of the B1 data of MOSI message 440 have been clocked into register 830. State machine 840 then resets count2 and changes to state 970.

In state 970, state machine 840 activates enable control 825a. Activating enable control 825 causes counter 835 to increment count2 as the data bits of MOSI message 440 are clocked into register 830. Counter 835 increments count2 until count2=16, at which point all of the B0 data of MOSI message 440 have been clocked into register 830. State machine 840 then resets count2 and changes to state 975 in which it goes idle until the next MOSI message is received.

Figure 11B:
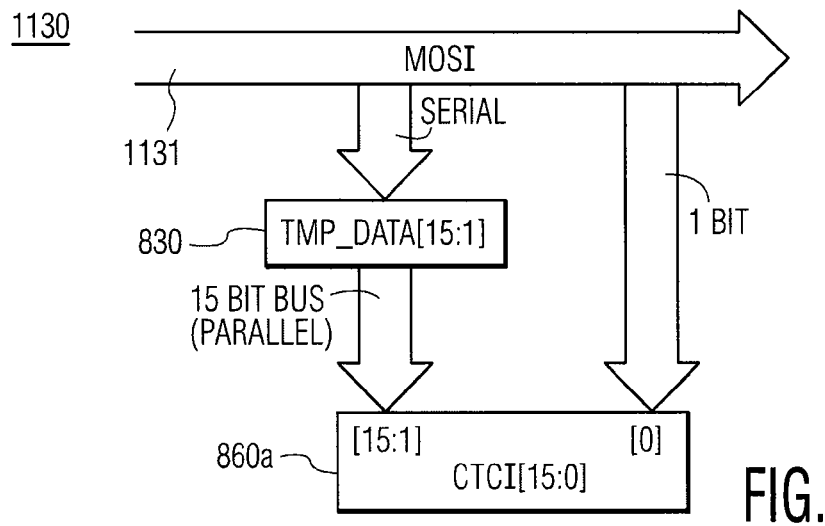
FIG. 11B illustrates a process of a normal-mode message write to a CTCI register, in accordance with an exemplary embodiment of the invention.
Figure 11C:
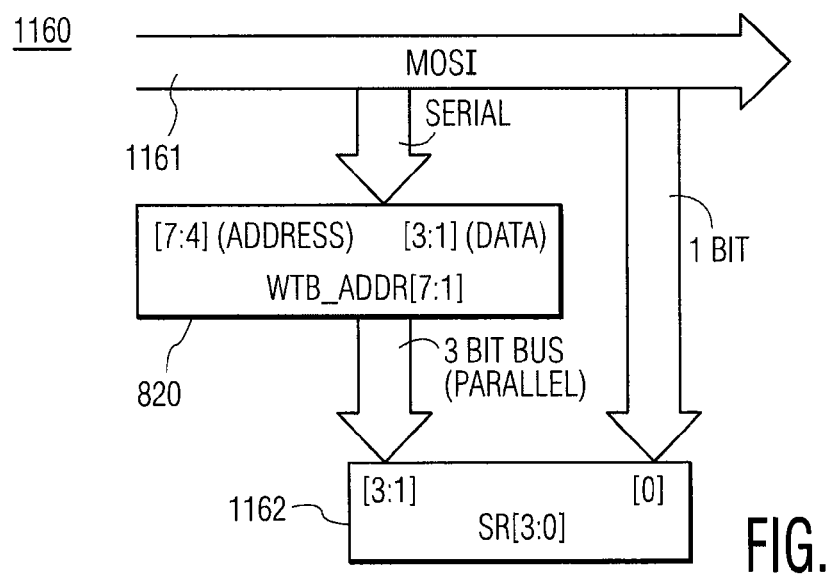
FIG. 11C illustrates a process of a 8-bit special-mode write operation, in accordance with an exemplary embodiment of the invention.

In state 980, the next four bits (SR3 through SR0) of MOSI message 440 are clocked into register 820 as WTB_ADbR[3:0]. These four data bits are stored in the SR register. State machine 840 then changes to state 985 in which it goes idle until the next MOSI message is received. FIG. 11C illustrates the clocking-in of the data bits into register 830 and mirroring to an external SR register in more detail.

Figure 10A:
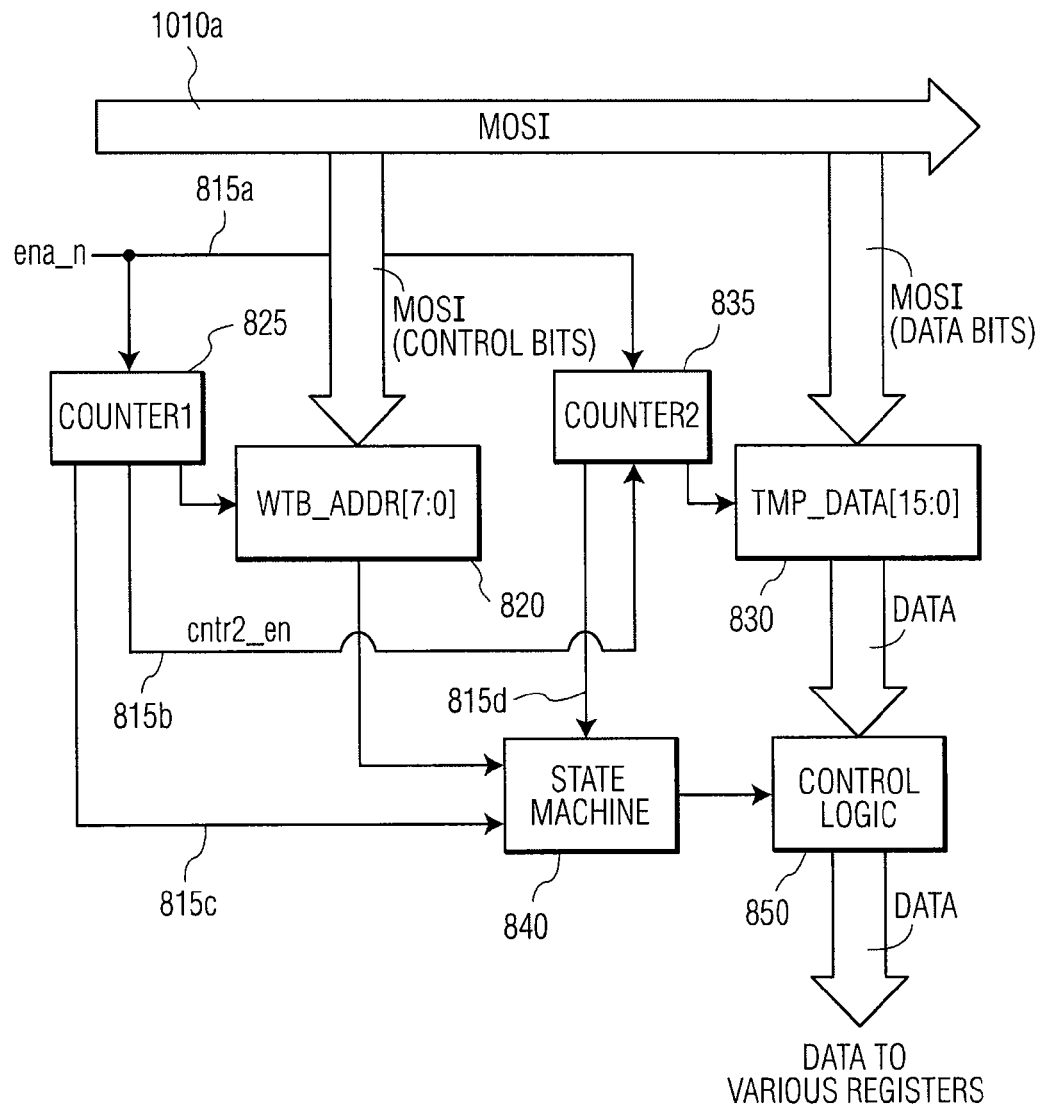
FIG. 10A illustrates a process of a normal-mode write, in accordance with an exemplary embodiment of the invention.

FIG. 10A illustrates a flow diagram 1000 of the flow of data of a MOSI message 1010a in FWI 410, in accordance with an exemplary embodiment of the present invention. In the embodiment illustrated in FIG. 10A, MOSI message 1010a is a normal-mode MOSI message including data bits and control bits, the control bits specifying a write. Flow diagram 1000 illustrates how the control bits and data bits of MOSI message 1010a propagate through various internal components of FWI 410, e.g., address register 820, data register 830, state machine 840, and control logic 850. FIG. 10A also illustrates connections 815c and 815d by which state machine 840 monitors count1 and count2.

Because FIG. 10A illustrates the processing of a MOSI message 1010a specifying a write operation for a normal-mode message, FIG. 10A assumes that state machine 840 determines that the control bits of MOSI message 1010a describe a normal-mode write request. Thus, after FWI 410 clocks the control bits of MOSI message 1010a to register 820, it clocks the data bits of MOSI message 1010a to register 830. State machine 840 manipulates control logic 850 to prepare for data bits to be received from register 830 and to process such data bits on an as-received basis, if able. FIG. 11B illustrates the clocking-in of the data bits into register 830 and CTCI register 860a (not illustrated in FIG. 10A) in more detail.

Figure 10B:
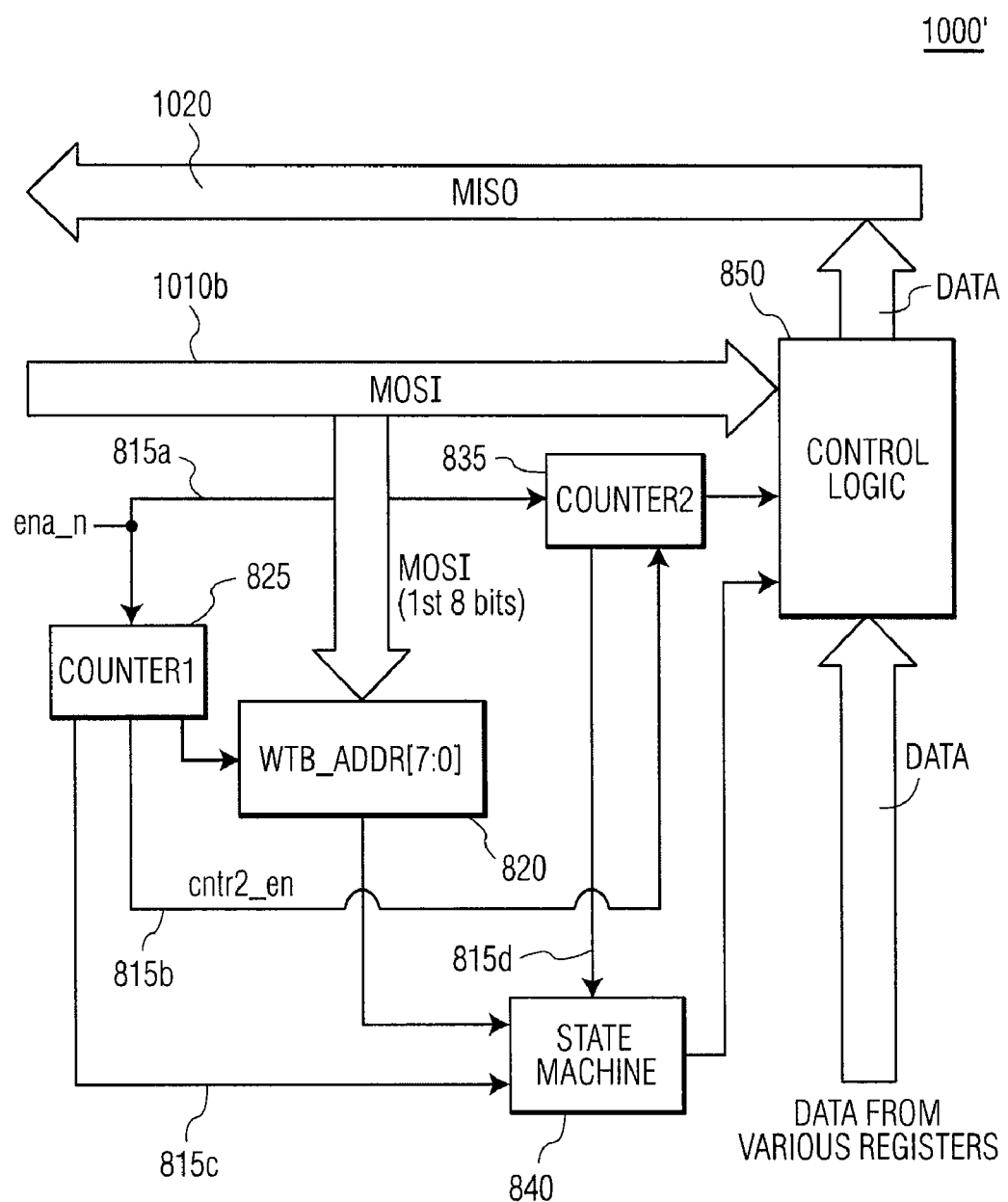
FIG. 10B illustrates a process of a normal-mode read, in accordance with an exemplary embodiment of the invention.

FIG. 10B illustrates a flow diagram 1000' of the flow of data of a MOSI message 1010b in FWI 410, in accordance with an exemplary embodiment of the present invention. In the embodiment illustrated in FIG. 10B, MOSI message 1010b is a normal-mode MOSI message including data bits and control bits, the control bits specifying a read. Flow diagram 1000 illustrates how the control bits of MOSI message 1010a propagate through various internal components of FWI 410, e.g., address register 820, state machine 840, and control logic 850, and how FWI 410 response with a MISO message 1020. The data bits of MOSI message 1010b are ignored.

Because FIG. 10B illustrates the processing of a MOSI message 1010b specifying a read operation for a normal-mode message, FIG. 10B assumes that state machine 840 determines that the control bits of MOSI message 1010b describe a normal-mode read request. Thus, after FWI 410 clocks the control bits of MOSI message 1010b to register 820, it prepares to read from the register specified by the address bits contained in the control bits of MOSI message 1010b. The data bits of MOSI message 1010b are ignored. Control logic 850 retrieves the register contents of the register specified by the address bits of MOSI message 1010b and outputs such contents in the data field of MISO message 1020 outputted a miso output terminal 890d.

Referring now to FIG. 11A, there is illustrated a diagram 1100 detailing the data interchange between internal CTCI register 860a and external CTC register 1101, in accordance with an exemplary embodiment of the present invention. CTCI register 860a communicates CTCI[7:0] bits via ctc[7:0] bus interface 890i to CTC register 1101. In other words, CTC register 1101 mirrors the lower byte of CTCI register 860a. Table 6 illustrates the details of CTCI register 860a/CTC register 1101:

TABLE 6

CTC/CTCI Register (Address 0x00)

| Bit # | Internal/External | Access | Description |
|---|---|---|---|
| 15 | Internal | R/W | Spare/Unused |
| 14 | Internal | R/W | Spare/Unused |
| 13 | Internal | R/W | Spare/Unused |
| 12 | Internal | R/W | Spare/Unused |
| 11 | Internal | R/W | Force ext_ab_n |
| 10 | Internal | R/W | ext_ab_n select<br>0: ext_ab_n = CTCI[11]<br>1: ext_ab_n = ab_n |
| 9 | Internal | R/W | Force output bank |
| 8 | Internal | R/W | Output bank select<br>0: output bank = CTCI[9]<br>1: output bank = ab_n |
| 7 | External | R/W | RF Control |
| 6 | External | R/W | RF Control |
| 5 | External | R/W | RF Control |
| 4 | External | R/W | RF Control |
| 3 | External | R/W | RF Control |
| 2 | External | R/W | RF Control |
| 1 | External | R/W | RF Control |
| 0 | External | R/W | RF Control |

As illustrated in Table 6, the signal ext_ab_n present at output terminal 890k (illustrated in FIG. 8) is selected by CTCI[10]. When CTCI [10]=0, ext_ab_n=CTCI [11]. Otherwise, when CTCI [10]=1, ext_ab_n=ab_n. The signal, ab_n, is the signal presented at input terminal 880d. CTCI[8], CTCI[9], and ab_n, which is input at terminal 880d, are involved with selecting which internal banked register BXi (register 870b or 870c) to route to output bus interface 890j for external banked registers BX.

If CTCI[8]=0, then CTCI[9] determines which of internal banked registers BXi are routed to output bus interface 890j. If CTCI[9]=0, then bank 0 is selected. If CTCI[9]=1, then bank 1 is selected.

Otherwise, if CTCI[8]=1, the ab_n signal determines which of internal banked registers BXi are routed to output bus interface 890j. If ab_n=0, then bank 0 is selected. If ab_n=1, then bank 1 is selected.

A MOSI message specifying a write to CTCI register 860a will write data bits DAT15 through DAT0 of such MOSI message to CTCI[15:0] of CTCI register 860a. A MOSI message specifying a read from CTCI register 860a will read CTCI[15:0] and cause FWI 410 to return that data as data bits DAT15 through DAT0 of a MISO message output at miso output terminal 890d.

Referring now to FIG. 11B, there is illustrated a diagram 1130 detailing the flow of data bits 1131 of a MOSI message specifying a write to CTCI register 860a. As described above, during a write process, the data bits of a MOSI message are normally transferred into register 830 as they come in from mosi input terminal 880c. From register 830, the data bits are then transferred to a destination register in a parallel fashion on one clock transition.

Due to clock limitations, during several write operations, it is necessary to transfer the first 15 data bits of a MOSI message 1131 into register 830 but to strip the last bit of data from MOSI message 1131 and send it directly to the destination register. FIG. 11B illustrates such an occurrence. As data bits D15 through D1 of MOSI data bits 1131 are received, they are stored in register 830 as TMP_DATA[15:1]. The least significant bit, D0, of MOSI data bits 1131 is not stored in register 830 but is instead clocked directly into CTCI register 860a as TMP_DATA[15:1] are clocked in parallel from register 830 to CTCI register 860a. The processing illustrated in FIG. 11B is relevant for writing to any register internal to FWI 410, not just to CTCI register 860a.

Figure 1:
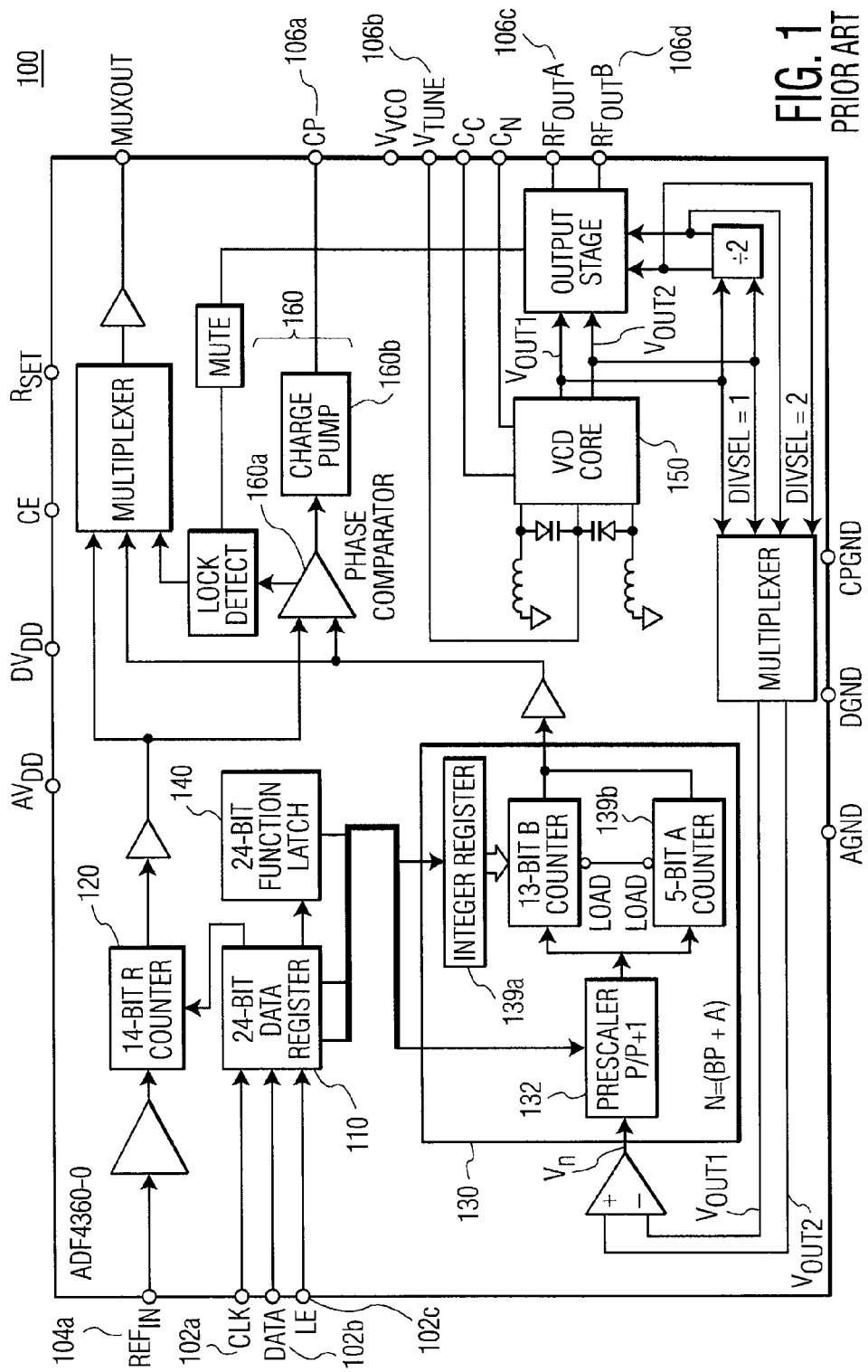
FIG. 1 is a diagram of a conventional integrated synthesizer and voltage controlled oscillator (VCO).
Figure 2:
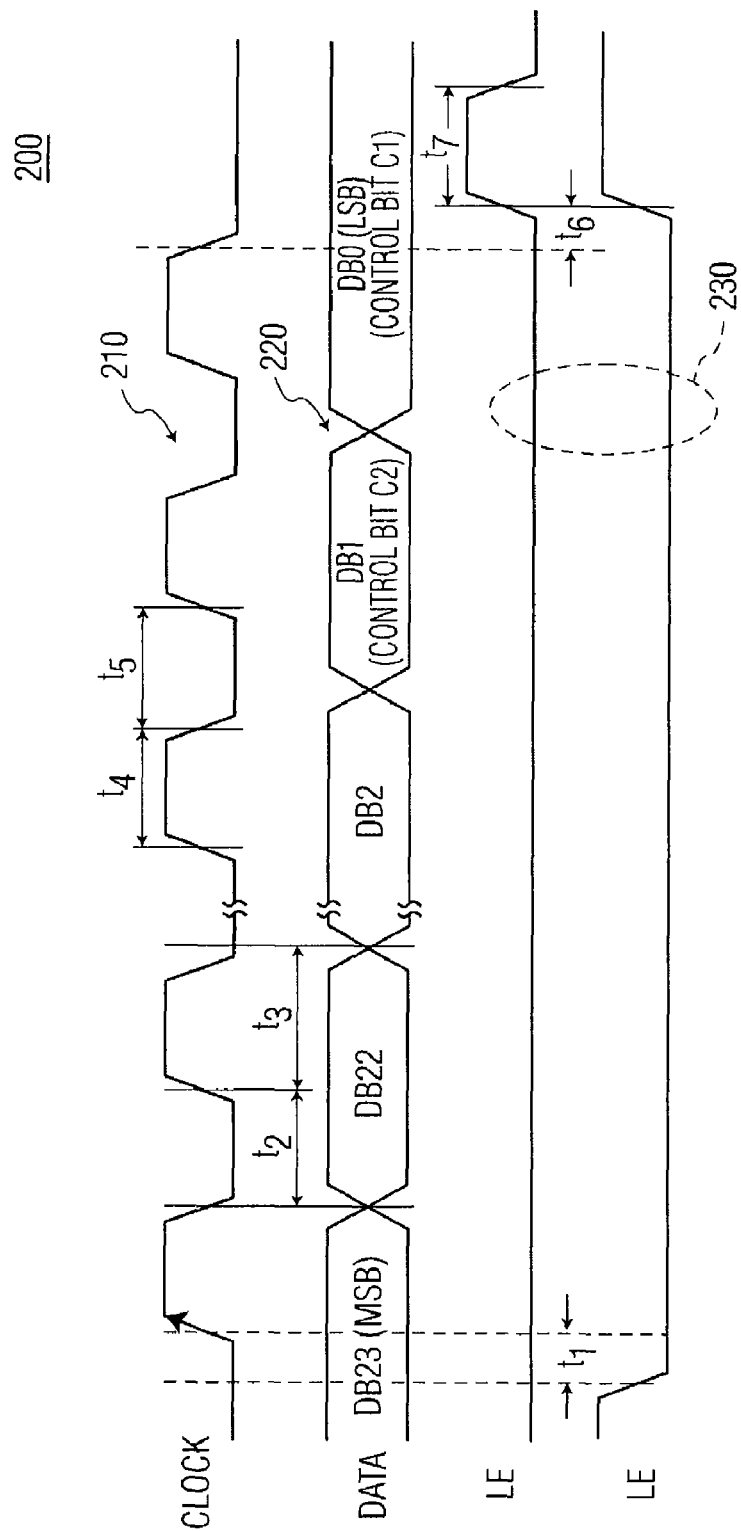
FIG. 2 illustrates a timing diagram of inputs to the integrated synthesizer and VCO illustrated in FIG. 1.
Figure 3A:
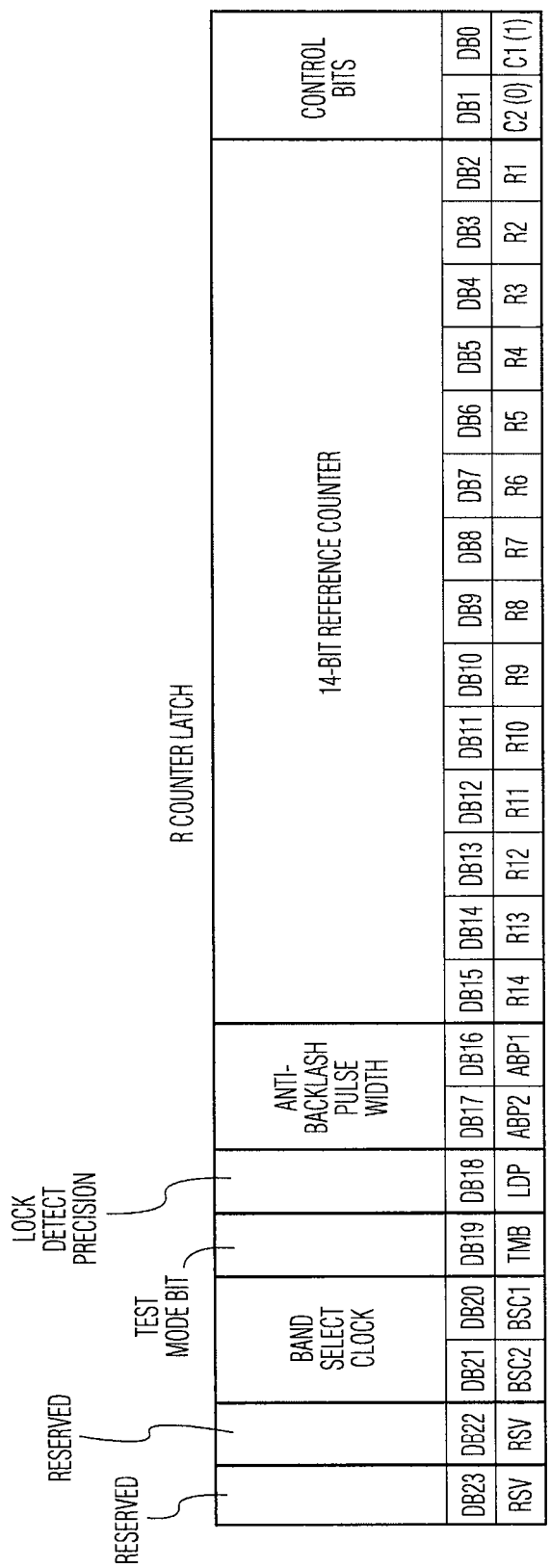
FIG. 3A illustrates a format of a serial input signal for programming an R counter latch of the integrated synthesizer and VCO illustrated in FIG. 1.
Figure 3B:
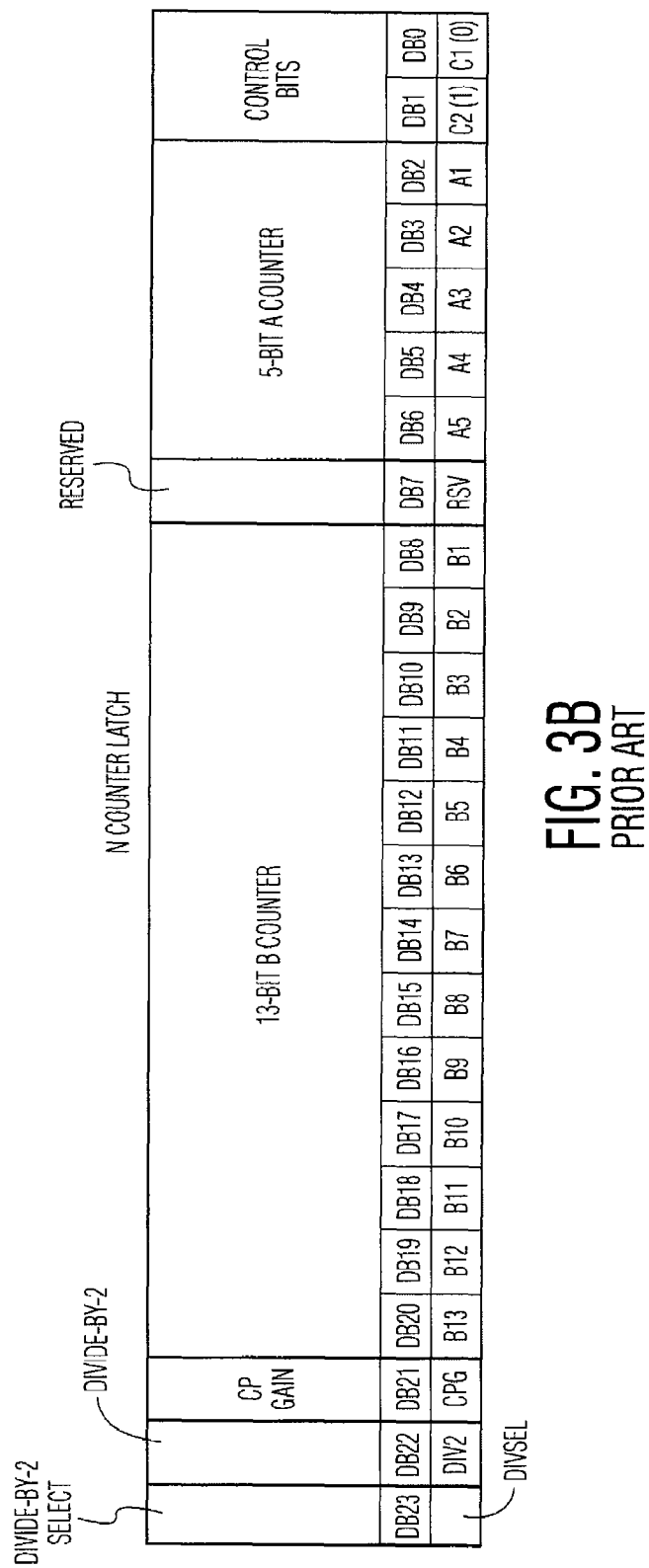
FIG. 3B illustrates a format of a serial input signal for programming an N counter latch of the integrated synthesizer and VCO illustrated in FIG. 1.

Illustrated in FIG. 11C is a diagram 1160 detailing the flow of an 8-bit special-mode MOSI message 1161 specifying a write. As described above, 8-bit special-mode write messages utilize the first 4 bits of the message as control bits and the remaining 4 bits as data. The data bits are always intended for an SR register (not illustrated) within FWI 410. As illustrated in FIG. 1C, as an 8-bit special MOSI message 1161 is received, the first 7 bits of such message are clocked into register 820, but the least significant bit bypasses register 820 and is clocked directly to SR register 1162 as the 3 data bits of register 820, i.e., WTB_ADDR[3:1], are clocked in parallel from register 820 to SR register 1162. FWI 410 mirrors the contents of SR register 1162 at sr[3:0] bus interface 890b.

Figure 12:
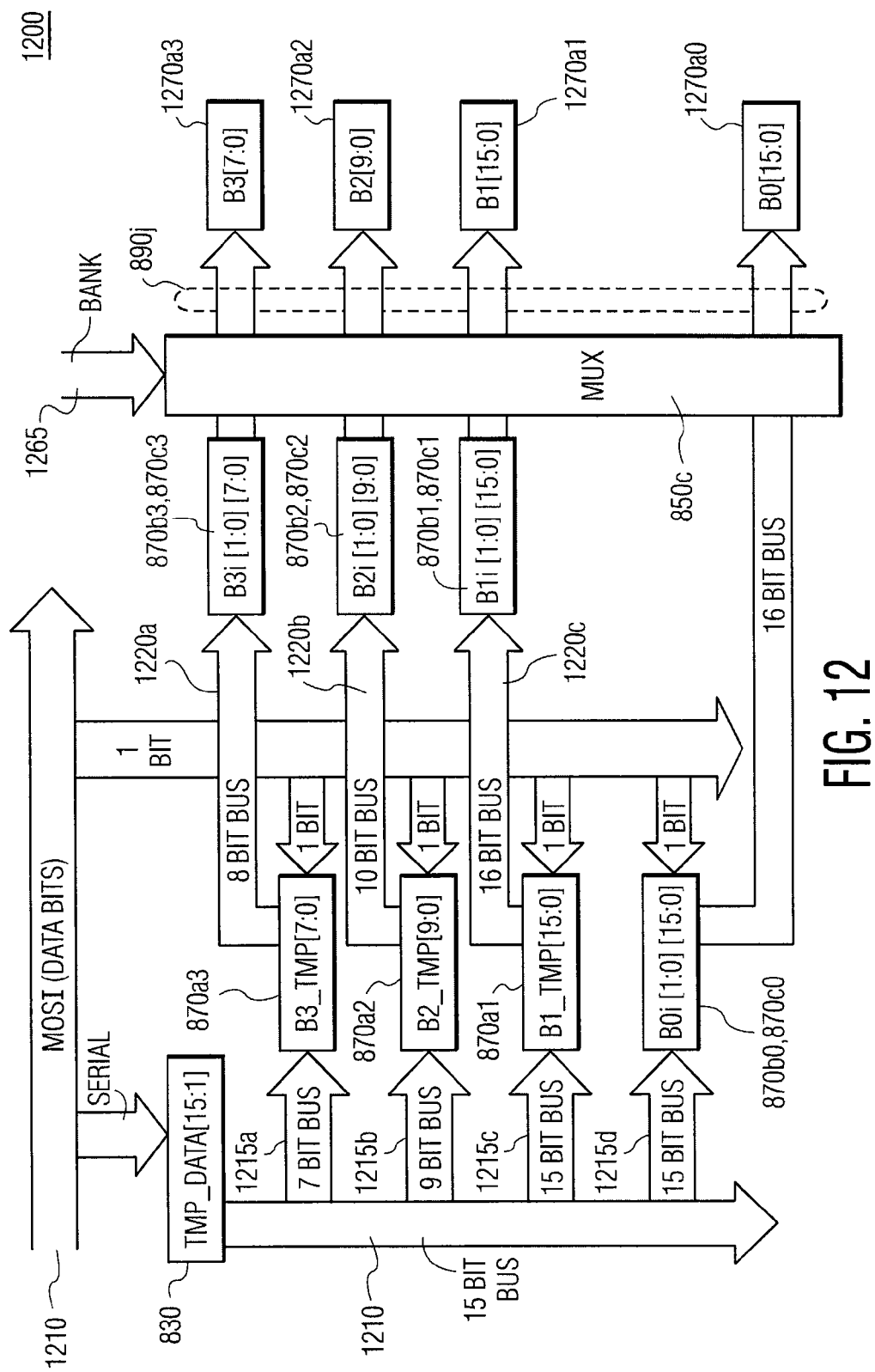
FIG. 12 illustrates a process of a non-8-bit special-mode write operation, in accordance with an exemplary embodiment of the invention.

Referring now to FIG. 12, there is illustrated a diagram 1200 detailing the flow of bits of a variable-length special-mode write MOSI message 1210, in accordance with an exemplary embodiment of the present invention. Variable-length special mode write messages are similar to normal mode write messages, except the data bits of special mode write messages are, by definition, routed to various internal banked registers B3i, B2i, B1i, and B0i and mirrored on various external banked registers B3, B2, B1, B0 (respectively labeled as 1270a3, 1270a2, 1270a1, and 1270a0 in FIG. 12) depending on whether the variable-length special mode message is a 40-, 50-, or 58-bit message.

FWI 410 includes two internal register banks, BXi[1] and BXi[0], and a switching system (multiplexer 850c) for selecting which internal register bank will be routed to external registers 1270a. Register bank BXi[1] (labeled as 870b in FIG. 8) includes four internal registers: B3i[1] (labeled as 870b3 in FIG. 12), B2i[1] (labeled as 870b2 in FIG. 12), B1i[1] (labeled as 870b1 in FIG. 12), and B0i[1] (labeled as 870b0 in FIG. 12). Register bank BXi[0] (labeled as 870c in FIG. 8) includes four internal registers: B3i[0] (labeled as 870c3 in FIG. 12), B2i[0] (labeled as 870c2 in FIG. 12), B1i[0] (labeled as 870c1 in FIG. 12), and B0i[0] (labeled as 870c0 in FIG. 12).

Because register 830 is able to hold no more than 16 bits and data may be required to be loaded into all of registers 870b or 870c at one time, some data bits of MOSI message 1210 are clocked to BX_TMP registers 870a. The seven most significant data bits of the B3 word are loaded into temporary register 870a3 as B3_tmp[7:1] via 15-bit bus 1210 and 7-bit bus 1215a. The least significant data bit of the B3 word is loaded into temporary register 870a3 directly. The nine most significant data bits of the B2 word are loaded into temporary register 870a2 as B2_tmp[9:1] via 15-bit bus 1210 and 9-bit bus 1215b. The least significant data bit of the B2 word is loaded into temporary register 870a2 directly. The 15 most significant data bits of the B1 word are loaded into temporary register 870a1 as B1_tmp[15:1] via 15-bit bus 1210 and 15-bit bus 1215c. The least significant data bit of the B1 word is loaded into temporary register 870a1 directly. Finally, the 15 most significant data bits of the B0 word are loaded into either B0i[1] register 870b0 or B0i[0] register 870c0 via 15-bit bus 1210 depending in the value of the bank bit of MOSI message 1210. The least significant data bit of the B0 word is loaded into either B0i[1] register 870b0 or B0i[0] register 870c0 directly.

The bank (BNK) bit of MOSI message 1210 determines which internal bank, i.e., which BXi, to load from BX_TMP. In other words, it determines whether to load temporary registers 870a to internal banked registers 870b or to internal banked registers 870c. B3i[1:0][7:0] internal banked registers 870b3, 870c3 are loaded from B3_TMP[7:0] temporary register 870a3 via 8-bit bus 1220a; B2i[1:0][9:0] internal banked registers 870b2, 870c2 are loaded from B2_TMP[9:0] temporary register 870a2 via 10-bit bus 1220b; and B1i[1:0][15:0] internal banked registers 870b1, 870c1 are loaded from B1_TMP[15:0] temporary register 870a1 via 16-bit bus 1220c.

As described above, bits of CTCI register 860a determine which bank of registers (BX[1] register bank 870b or BX[0] register bank 870c) are outputted to external bank registers 1270 via bus interface 890j. CTCI[8] determines which bit controls the bank selection 1265. If CTCI[8]=0, then CTCI[9] controls bank selection 1265. Then, if CTCI[9]=0, bank 0, i.e., register bank 870b, is selected for output to external banked registers 1270; if CTCI[9]=1, bank 1, i.e., register bank 870c, is selected for output to external banked registers 1270. Otherwise, if CTCI[8]=1, then ab_n controls the bank selection 1265. Then, if ab_n=0, bank 0 is selected for output to external banked registers 1270; if ab_n=1, bank 1 is selected for output to external banked registers 1270. Mux 850c then switches the selected internal banked registers 870b3 or 870c3 to external banked registers 1270a.

As mentioned above, FIG. 12 illustrates a write operation to the banked registers in the special mode. For a normal-mode MOSI message specifying a write to one of the bank addresses, the bank bit in such MOSI message determines which BXi (BXi[0] or BXi[1]) bank to load from register 830. FIG. 11B is relevant to such an operation (although register 860a illustrated in FIG. 11B would be either of the BXi[0] or BXi[1] registers.

Figure 13:
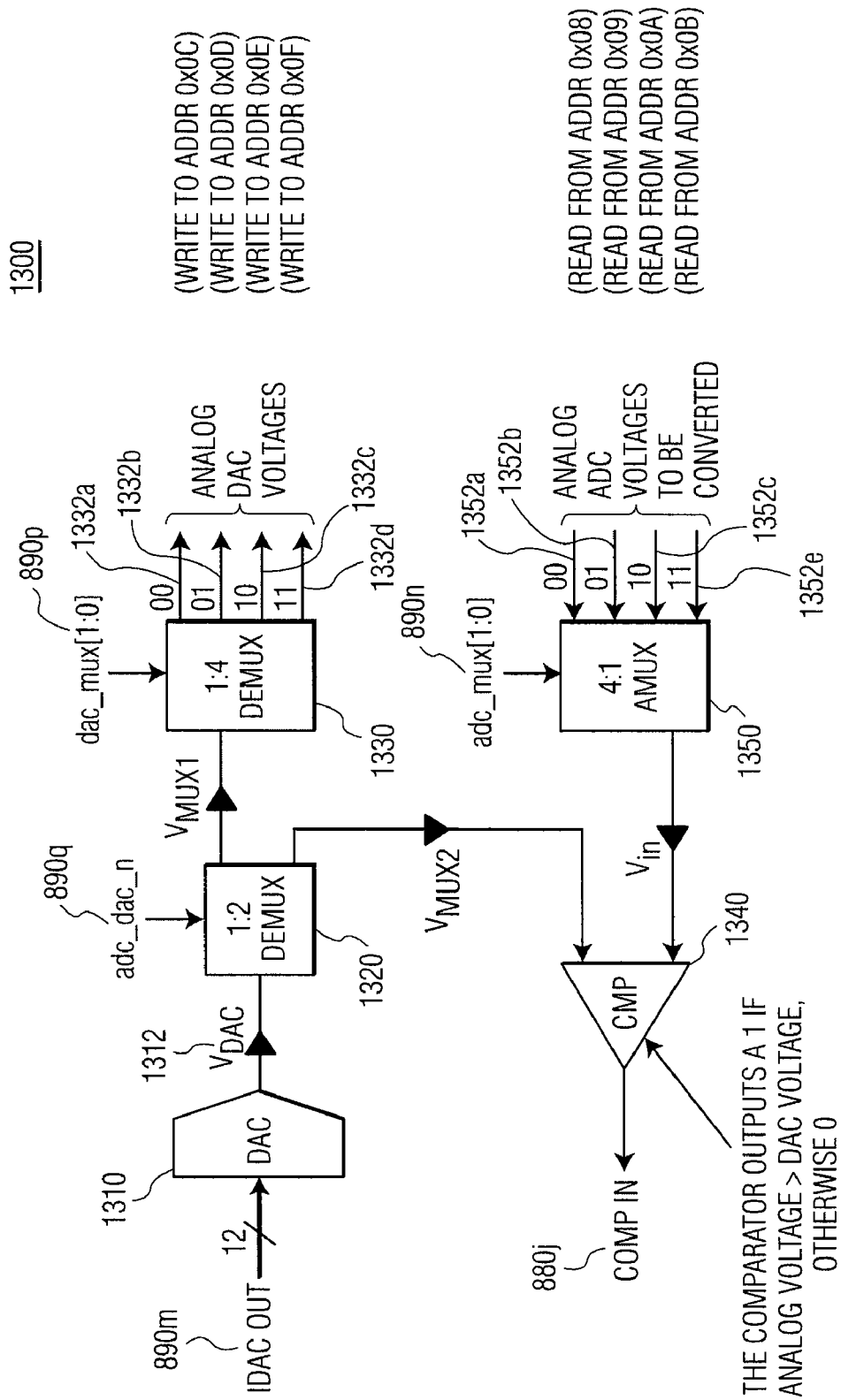
FIG. 13 illustrates analog interface components for performing digital-to-analog and analog-to-digital conversions, in accordance with an exemplary embodiment of the invention.

Referring now to FIG. 13, there are illustrated analog interface components 1300 of analog circuitry 470 (illustrated in FIG. 4), in accordance with an exemplary embodiment of the present invention. Analog interface components 1300 are external to FWI 410 and are used for controlling successive approximation register (SAR) analog-to-digital (A/D) conversions (herein also "ADC") and direct digital-to-analog conversion (DAC) access.

A direct DAC access is initiated with a normal write operation to addresses 0x0C through 0x0F; an SAR A/D conversion is initiated with a normal read operation to 0x08 through 0x0B.

If state machine 840 determines that MOSI message 440 corresponds to a DAC task, control logic 850d applies the data bits of MOSI message 440 to idac_out[11:0] bus interface 890m as IDAC_OUT[11:0] as the data bits are received. DAC 1310 of analog interface components 1300 receives the IDAC_OUT bits as they are outputted by control logic 850d and generates a voltage, $v_{DAC}$ 1312, which is an analog representation of the IDAC_OUT bits so far received from control logic 850d. $v_{DAC}$ continues to change as more and more data bits are received by control logic 850d and sent to DAC 1310.

$v_{DAC}$ is applied to a demultiplexer 1320 and is outputted from demultiplexer 1320 as $v_{MUX1}$ or $v_{MUX2}$, depending on the value of adc_dac_n received from adc_dac_n terminal 890q. In direct DAC access, adc_dac_n=0, so that $v_{DAC}$ is outputted as $v_{MUX1}$. $v_{MUX1}$ is applied to demultiplexer 1330 which directs $v_{MUX1}$ to one of outputs 1332a, 1332b, 1332c, and 1332d, depending on the value of DAC_MUX[1:0]

received from dac_mux[1:0] terminal 890*p*. Outputs 1332*a*, 1332*b*, 1332*c*, and 1332*d* are coupled to VCO 480 (illustrated in FIG. 4) via communication line 485*a* (illustrated in FIG. 4) and control the frequencies of up to four voltage signals produced by VCO 480.

A $v_{MUX1}$ outputted at output 1332*a* corresponds to a DAC write to address 0x0C and sets the frequency $f_1$ of a first signal $v_{VCO1}$ (not illustrated) produced by VCO 480; a $v_{MUX1}$ outputted at output 1332*b* corresponds to a DAC write to address 0x0D and sets the frequency $f_2$ of a second signal $v_{VCO2}$ (not illustrated) produced by VCO 480; a $v_{MUX1}$ outputted at output 1332*c* corresponds to a DAC write to address 0x0E and sets the frequency $f_3$ of a third signal $v_{VCO3}$ (not illustrated) produced by VCO 480; and a $v_{MUX1}$ outputted at output 1332*d* corresponds to a DAC write to address 0x0F and sets the frequency $f_4$ of a fourth signal $v_{VCO4}$ (not illustrated) produced by VCO 480.

The seventh and eighth bits of MOSI serial message 440, which are written to register 820 at WTB_ADDR[1:0], act as the mux select bits, DAC_MUX[1:0], for demultiplexer 1330. These DAC_MUX[1:0] bits correspond to the destination address of the analog DAC voltages. The following list summarizes the desired register manipulation for direct DAC access:

WTB_ADDR[1:0] are transferred out to DAC_MUX[1:0]; adc_dac_n=0; and data bits of MOSI message 440 are transferred as IDAC_OUT[11:0] as they are received.

If state machine 840 determines that MOSI message 440 corresponds to an ADC task, control logic 850*d* ignores the data bits of MOSI message 440. Depending on the value of ADC_MUX[1:0] received from adc_mux[1:0] terminal 890*p*, a signal $v_{in}$ is selected by multiplexer 1350 from one of inputs 1352*a*, 1352*b*, 1352*c*, and 1352*e* for A/D conversion. The $v_{in}$ signal is applied to comparator 1340.

A $v_{in}$ input at input 1352*a* corresponds to an ADC read from address 0x08 and corresponds to a first signal produced by VCO 480; a $v_{in}$ input at input 1352*b* corresponds to an ADC read from address 0x09 and corresponds to a second signal produced by VCO 480; a $v_{in}$ input at input 1352*c* corresponds to an ADC read from address 0x0A and corresponds to a third signal produced by VCO 480; and $v_{in}$ input at input 1352*e* corresponds to an ADC read from address 0x0B and corresponds to a first signal produced by VCO 480. The $v_{in}$ signal is communicated from VCO 480 to analog interface components 1300 via communication line 485*b* (illustrated in FIG. 4).

In A/D conversions, adc_dac_n=1, so that the input voltage $v_{DAC}$ of demultiplexer 1320 is output to comparator 1340 as $V_{MUX2}$. SAR ADC/DAC control logic 850*d* controls $v_{DAC}$ by outputting IDAC[11:0] values to DAC 1310. SAR ADC/DAC control logic 850*d* controls $v_{DAC}$ to generate a sequence of COMP bits output by comparator 1340 resulting from the comparison in comparator 1340 of $v_{MUX2}$ ($v_{DAC}$) to $v_{in}$. More specifically, SAR ADC/DAC control logic 850*d* generates the IDAC[11:0] through a successive approximation algorithm to successively approximate $v_{in}$, through changing $v_{MUX2}$ ($v_{DAC}$) to generate the sequence of COMP bits. The sequence of COMP bits are input into FWI 410 at input terminal 880*j* as COMP_IN bits. The sequence of COMP_IN bits compose the digital representation of the selected $v_{in}$ signal.

Referring to FIG. 14A, there is illustrated a timing diagram that details the signal manipulations of analog interface components 1300 corresponding to a direct DAC access. There, it is illustrated that the WE of MOSI message 440 is equal to 1 as DAC functions correspond to write operations; the BNK bit may be either 0 or 1; and the T bit is equal to 1 as DAC functions require MOSI message 440 to be in the normal mode. After state machine 840 determines the state of BNK bit (within 1 clock cycle), FWI 410 outputs the value of the BNK bit at bank output terminal 890*e*.

Now the values of the control signals of FIG. 14A are described. The ADC_MUX[1:0] bits are not used in a DAC function and are, therefore, unchanged by a D/A write. Thus, the signal for ADC_MUX[1:0] is identified by FIG. 14A as unchanged.

The adc_dac_n bit remains in its previous state until state machine 840 determines that MOSI message 440 corresponds to a write operation to one of addresses 0x0C to 0x0F. After the receipt of address bits ADD4 to ADD2, state machine 840 is able to determine that MOSI message 440 specifies a write to one of these addresses, i.e., that MOSI message 440 specifies a DAC (although, state machine 840 cannot determine which one of addresses 0x0C through 0x0F is written to until the two least significant address bits are received). Thus, after state machine 840 receives address bits ADD4 to ADD2, it is able to determine, within one clock cycle, that MOSI message 440 corresponds to a D/A conversion and therefore sets adc_dac_n to 0, where it remains until a subsequent MOSI message is received.

Similarly, the DAC_MUX[1:0] bits remain in their previous states until state machine 840 determines which register is to be written to. After the receipt of address bit ADD1, state machine 840 is able to determine that MOSI message 440 specifies a write to either one of addresses 0x0C or 0x0D or one of addresses 0x0E or 0x0F. Thus, after state machine 840 receives address bit ADD1, FWI 410 is able to set DAC_MUX[1]=ADD1. After the receipt of address bit ADD0, state machine 840 is able to determine the address to be written to and, within one clock cycle after receiving ADD0, is able to set DAC_MUX[0]=ADD0. Thus, within one clock cycle of receiving ADD0, state machine 840 is able to set DAC_MUX[1:0] which is applied to demultiplexer 1330 as DAC_MUX[1:0] via output terminal 890*p*.

The COMP_IN bit, which is received at input terminal 880*j*, remains in its previous state throughout all of MOSI message 440. The signals SR[3:0] and SMC[3:0] which are output by register 820 at respective bus interfaces 890*b* and 890*c* also remain in their previous states throughout all of MOSI message 440.

The remaining signals illustrated in FIG. 14A correspond to IDAC_OUT[11:0] bits at bus interface 890*m*. The four most significant data bits (DAT15 to DAT12) are not used in D/A conversions and are, therefore, ignored. As FWI 410 receives the remaining data bits DAT11 to DAT0 (with respective values P11 to P0) in MOSI message 440, it performs the D/A conversion on these data bits, using DAC 1310, as they are received. MOSI message 440 follows the convention that DAT11 corresponds to the largest level of resolution for the analog voltage to be calculated by DAC 1310; DAT0 corresponds to the smallest; and DAT 10 to DAT1 correspond to intermediate levels of resolution.

Within one clock cycle after receiving DAT11=P11, control logic 850*d* is able to set IDAC_OUT[11]=IDAC[11]=P11. As DAC 1310 continuously performs D/A conversions, once it receives IDAC_OUT[11] via IDAC_OUT[11] terminal 890*m*, it computes an analog voltage based on IDAC[11]. Within one clock cycle after receiving DAT10=P10, control logic 850*d* is able to set IDAC_OUT[10]=IDAC[10]=P10; IDAC_OUT[11] remains as previously set to DAT11. Once DAC 1310 receives IDAC_OUT[10] via IDAC_OUT[10] terminal 890*m*, it computes an analog voltage based on IDAC[11:10]. Control logic 850*d* sets the remaining IDAC_OUT[X]=IDAC[X]=PX for PX received from P9 to P0 in the manner described above until all P11 to P0 are output to DAC 1310. Beginning D/A conversions on PX received within one clock cycle after such PX are received and before the end of MOSI message is received, allows FWI 410 to direct D/A conversions at improved speeds. FWI 410 is not required to wait to perform D/A conversions until after all data are received but may begin such operations before the final data bit is received and complete such operation within one clock cycle after the final data bit is received.

Further, because FWI 410 performs D/A conversions on data bits beginning with data bits that specify the largest resolution of the analog output signal, the analog output signal has time to settle on values specified by such bits as subsequent bits specifying smaller resolutions are received. For example, data bits P11 specifies the greatest resolution of all PX bits. DAC 1310 may work to settle toward an analog value specified, at least in part, by P11 while other P10-P0 bits have not been received yet. It may continue to work to settle to an analog value specified, at least in part by P11 and other PX bits as those other PX bits are received. Thus, DAC 1310 need not wait until all PX bits are received to begin the conversion process. Such a feature allows for quicker D/A conversions controlled by FWI 410.

Figure 14B:
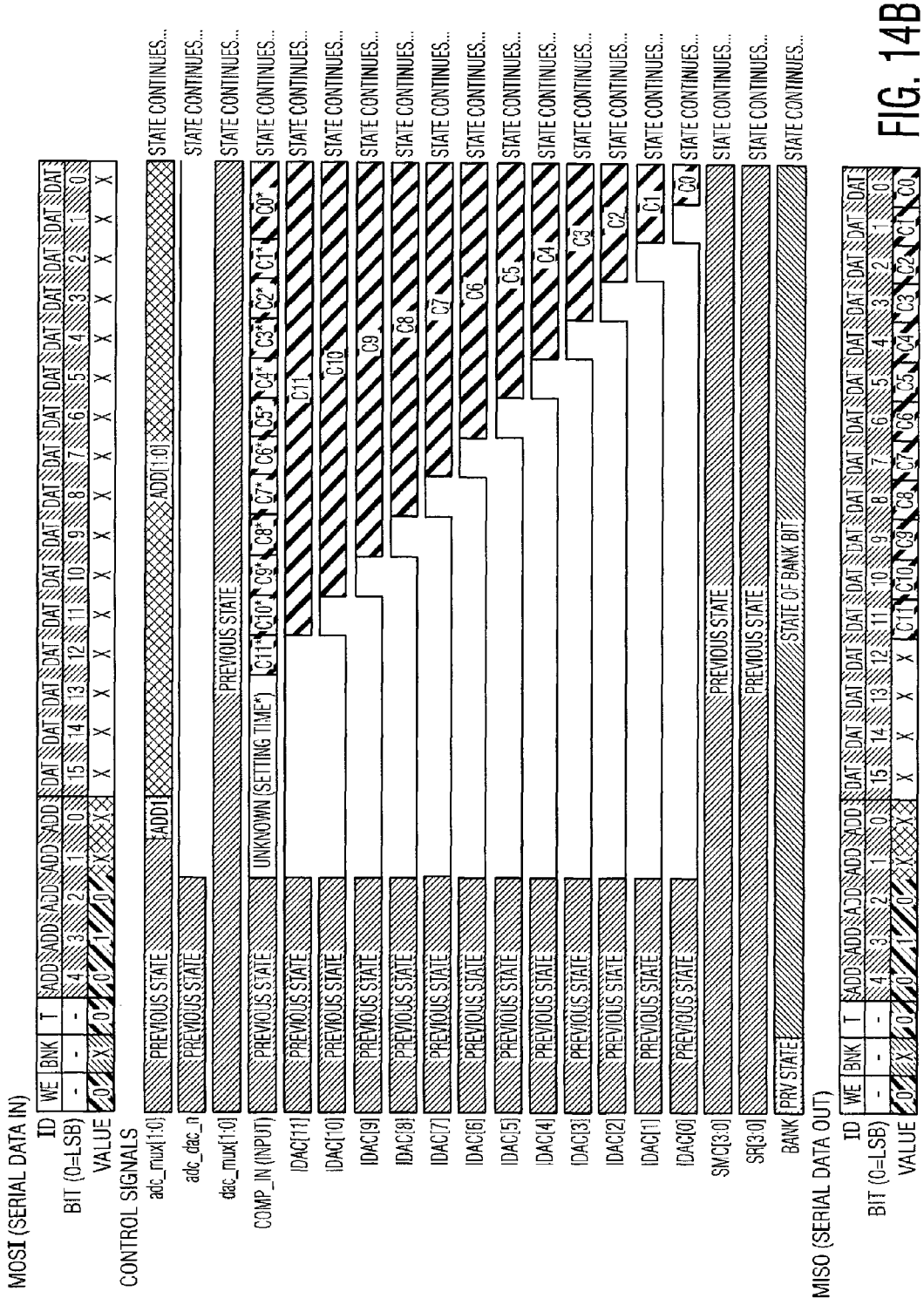
FIG. 14B illustrates timing requirements for an analog-to-digital conversion, in accordance with an exemplary embodiment of the invention.

Referring to FIG. 14B, there is illustrated a timing diagram that details the signal manipulations of analog interface components 1300 corresponding to an SAR A/D conversion. There, it is illustrated that the WE of MOSI message 440 is equal to 0 as A/D conversions correspond to read operations; the BNK bit may be either 0 or 1; and the T bit is equal to 1 as A/D conversions require MOSI message 440 to be in the normal mode. After state machine 840 determines the state of BNK bit (within 1 clock cycle), FWI 410 outputs the value of the BNK bit at bank output terminal 890e.

Now the values of the control signals of FIG. 14B are described. The DAC_MUX[1:0] bits are not used in an A/D conversion and are, therefore, unchanged by an A/D write. Thus, the signal for DAC_MUX[1:0] is identified by FIG. 13B as unchanged.

The adc_dac_n bit remains in its previous state until state machine 840 determines that MOSI message 440 corresponds to a read operation to one of addresses 0x08 to 0x0B. After the receipt of address bits ADD4 to ADD2, state machine 840 is able to determine that MOSI message 440 specifies a read to one of these addresses, i.e., that MOSI message 440 specifies an ADC (although, control logic 850d cannot determine which one of addresses 0x08 through 0x0B is to be read from until the two least significant address bits are received). Thus, after state machine 840 receives address bits ADD4 to ADD2, it is able to determine, within one clock cycle, that MOSI message 440 corresponds to an A/D conversion and therefore sets adc_dac_n to 1, where it remains until a subsequent MOSI message is received.

Analogously, the ADC_MUX[1:0] bits remain in their previous states until control logic determines which register is to be read from. After the receipt of address bit ADD1, state machine 840 is able to determine that MOSI message 440 specifies a read from either one of addresses 0x08 or 0x09 or one of addresses 0x0A or 0x0B. Thus, after state machine 840 receives address bit ADD1, FWI 410 is able to set ADC_MUX[1]=ADD1. After the receipt of address bit ADD0, control logic is able to determine the address to be read from and, within one clock cycle after receiving ADD0, is able to set ADC_MUX[0]=ADD0. Thus, within one clock cycle of receiving ADD0, control logic is able to set ADC_MUX[1:0].

The COMP_IN bit, which is received at input terminal 880j, is dependent upon the output of CMP 1340. The COMP_IN bit is described in more detail below. The signals SR[3: 0] and SMC[3:0] which are output by register 820 at respective bus interfaces 890b and 890c remain in their previous states throughout all of MOSI message 440.

The remaining signals illustrated in FIG. 14B correspond to IDAC_OUT[11:0] bits at bus interface 890m. They are calculated during the SAR A/D conversion. During the calculations, they represent the intermediate approximation of the analog signal to be converted. After the calculations conclude, they represent the final digital value for the analog signal.

The SAR ADC successively approximates an analog voltage signal beginning with calculating a digital value that corresponds to a roughest level of approximation of the analog voltage and then calculating digital values that correspond to successive finer levels of approximation of the analog voltage.

The SAR A/D conversion begins with control logic 850d setting IDAC[11]=1 and IDAC[10:0]=0. The IDAC[11:0] bits are output as IDAC_OUT[11:0] at idac_out[11:0] bus interface 890m and supplied to DAC 1310. DAC 1310 converts the IDAC[11:0] digital word [1,0,0,0,0,0,0,0,0,0,0,0] to an analog signal $v_{DAC}$ which demultiplexer 1320 directs to comparator (CMP) 1340 as $v_{MUX2}$. Multiplexer 1350 selects one of inputs 1352a, 1352b, 1352c, and 1352e depending on a value of ADC_MUX[1:0] which is described above. A voltage signal at the selected input corresponding to the analog value to be converted is output by multiplexer 1350 as $v_{in}$.

CMP 1340 compares $v_{MUX2}$ with $v_{IN}$. $v_{IN}$. If CMP 1340 determines that $v_{IN} > v_{MUX2}$, then CMP outputs a 1 as COMP_IN which is input into FWI 410 at input terminal 880j. If CMP 1340 determines that $v_{in} < v_{MUX2}$, then CMP outputs a 0 as COMP_IN. This computation of COMP_IN corresponds to C11 illustrated in FIG. 14B. It corresponds to a determination by CMP 1340 as to the digital representation of the roughest level of approximation of $v_{IN}$.

In the next iteration, control logic 850d sets IDAC[11]=C11, IDAC[10]=1, and keeps IDAC[9:0]=0. These values are output at idac_out[11:0] bus interface 890m and input into DAC 1310 which converts IDAC[11:0] to analog $v_{OUT}$. Multiplexer 1320 directs $v_{OUT}$ to CMP 1340 as $v_{MUX2}$. CMP compares $v_{MUX2}$ to $v_{in}$. If CMP 1340 determines that $v_{in} > v_{MUX2}$, then CMP outputs a 1 as COMP_IN which is input into FWI 410 at input terminal 880j. If CMP 1340 determines that $v_{in} < v_{MUX2}$, then CMP outputs a 0 as COMP_IN. This computation of COMP_IN corresponds to C10 illustrated in FIG. 13B. It corresponds to a determination by CMP 1340 as to the digital representation of the second roughest level of approximation of $V_{IN}$.

Analog interface components 1300 successively compute COMP_IN and CX. After C11 to C0 are calculated, control logic 850d is done directing the successive approximations of analog interface components 1300. It presents the C[11:0] to derouting logic 850e which shifts them to parallel-to-serial shifter 850f. Parallel-to-serial shifter 850f then spits out the C[11:0] in MISO message 450. The ACD operation is complete.

Figure 15A:
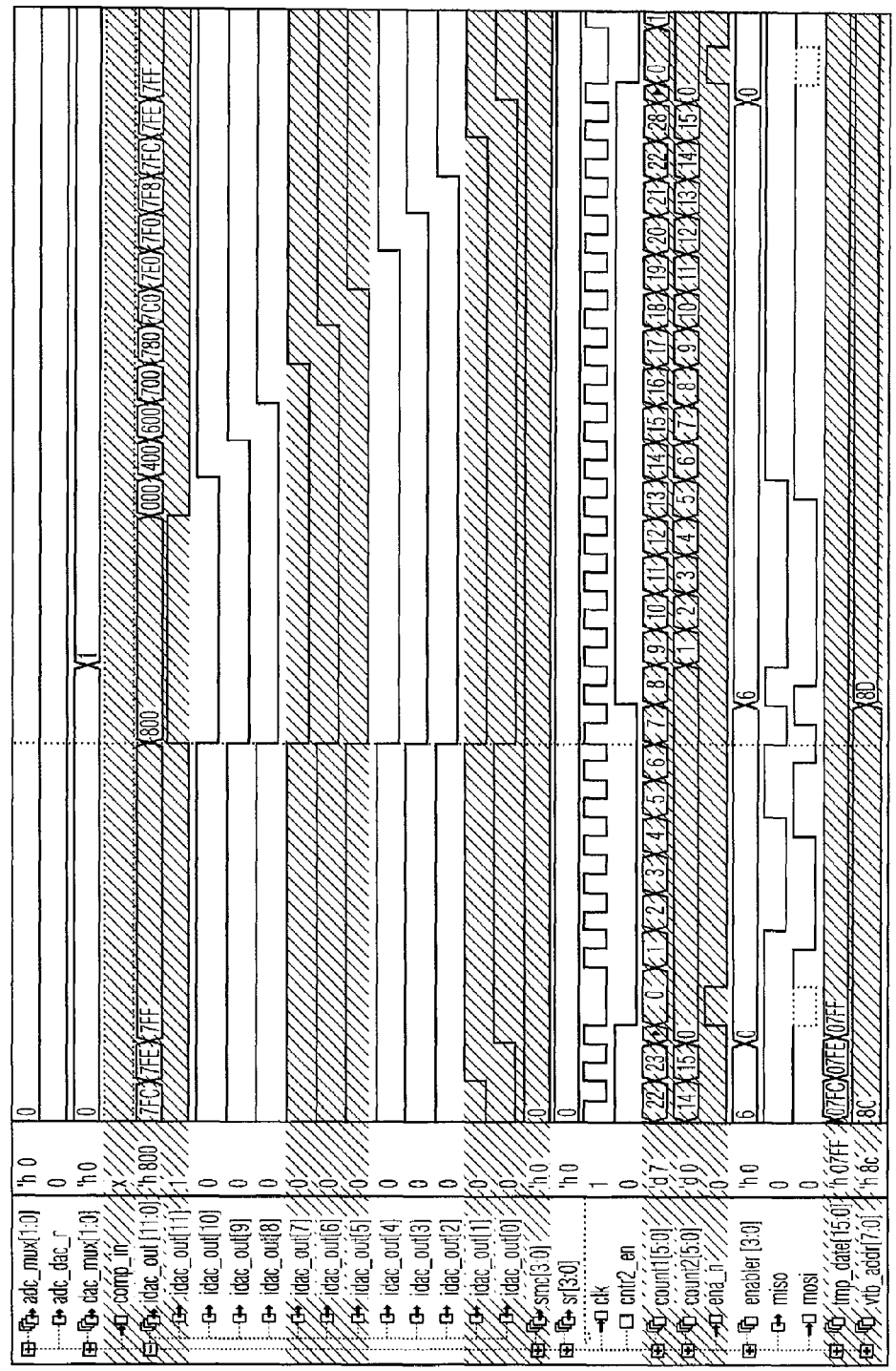
FIG. 15A illustrates a timing diagram showing signal timing for a direct digital-to-analog converter (DAC) access operation.
Figure 15B:
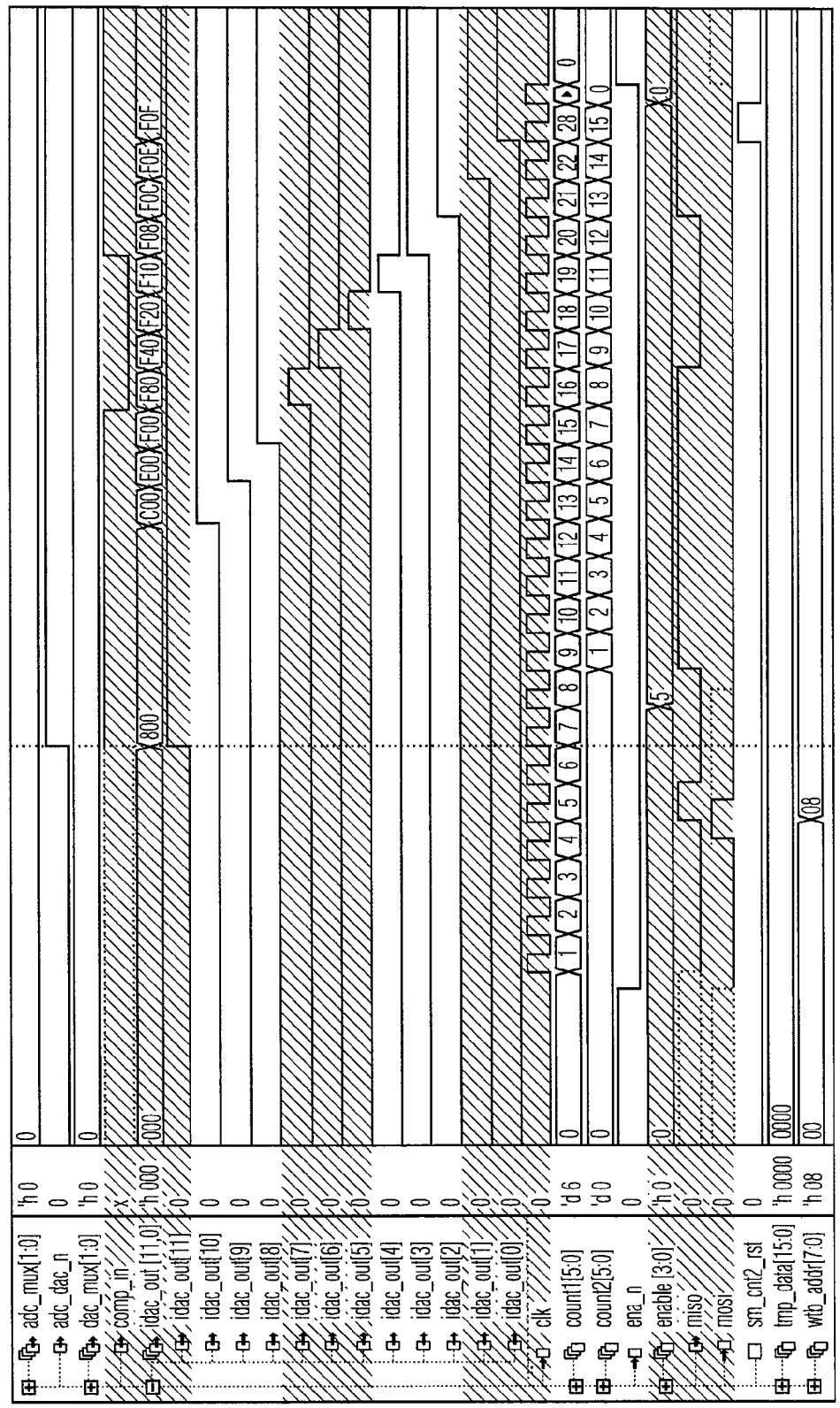
FIG. 15B illustrates a timing diagram showing signal timing for a successive approximation register analog-to-digital converter (SAR ADC) operation.
Figure 15C:
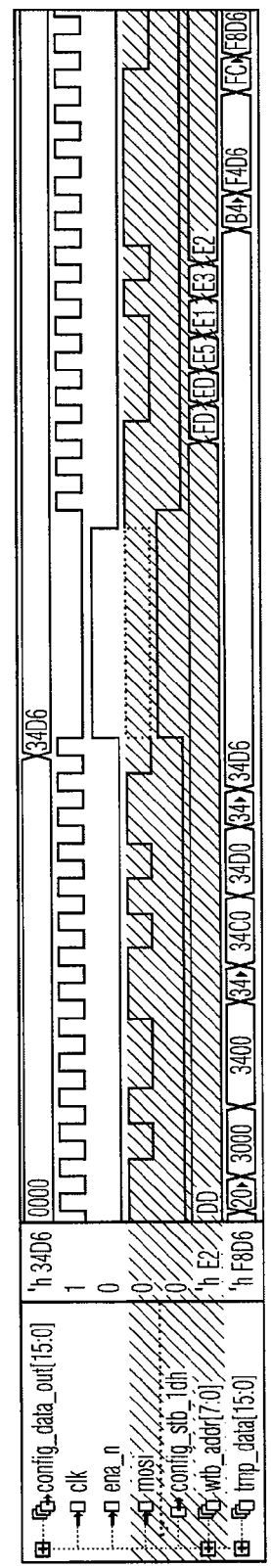
FIG. 15C illustrates a timing diagram showing signal timing for an external normal-mode write operation.
Figure 15D:
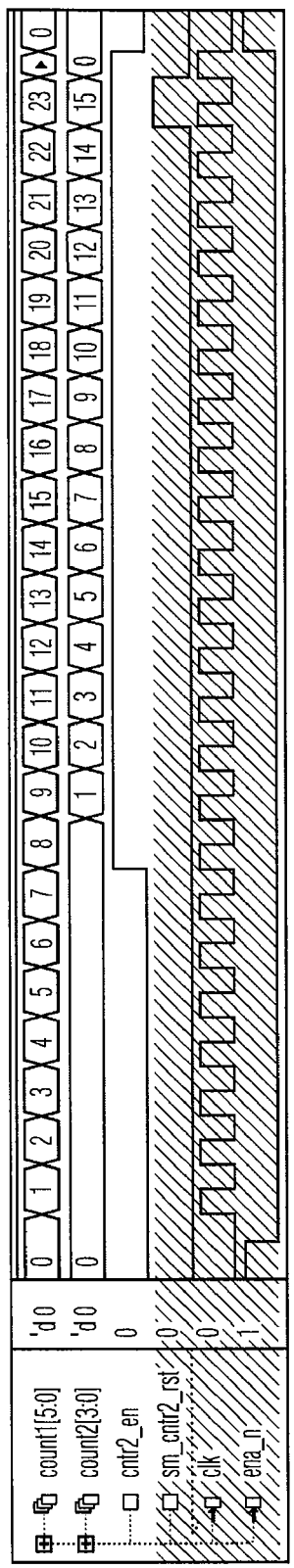
FIG. 15D illustrates a timing diagram showing signal timing for counters of the RFIC controller illustrated in FIG. 4.
Figure 15E:
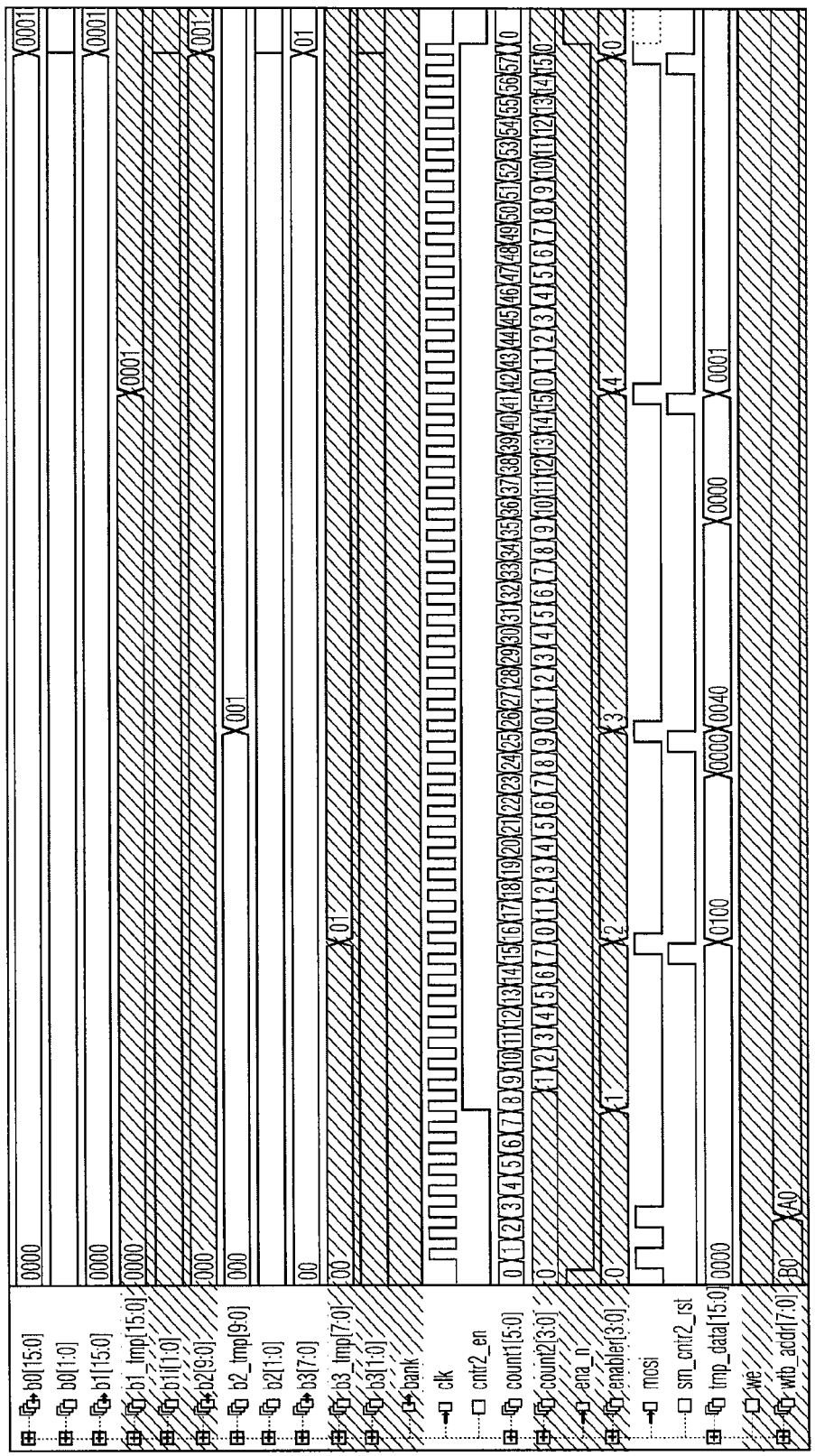
FIG. 15E illustrates a timing diagram showing signal timing for a 58-bit write operation.
Figure 15F:
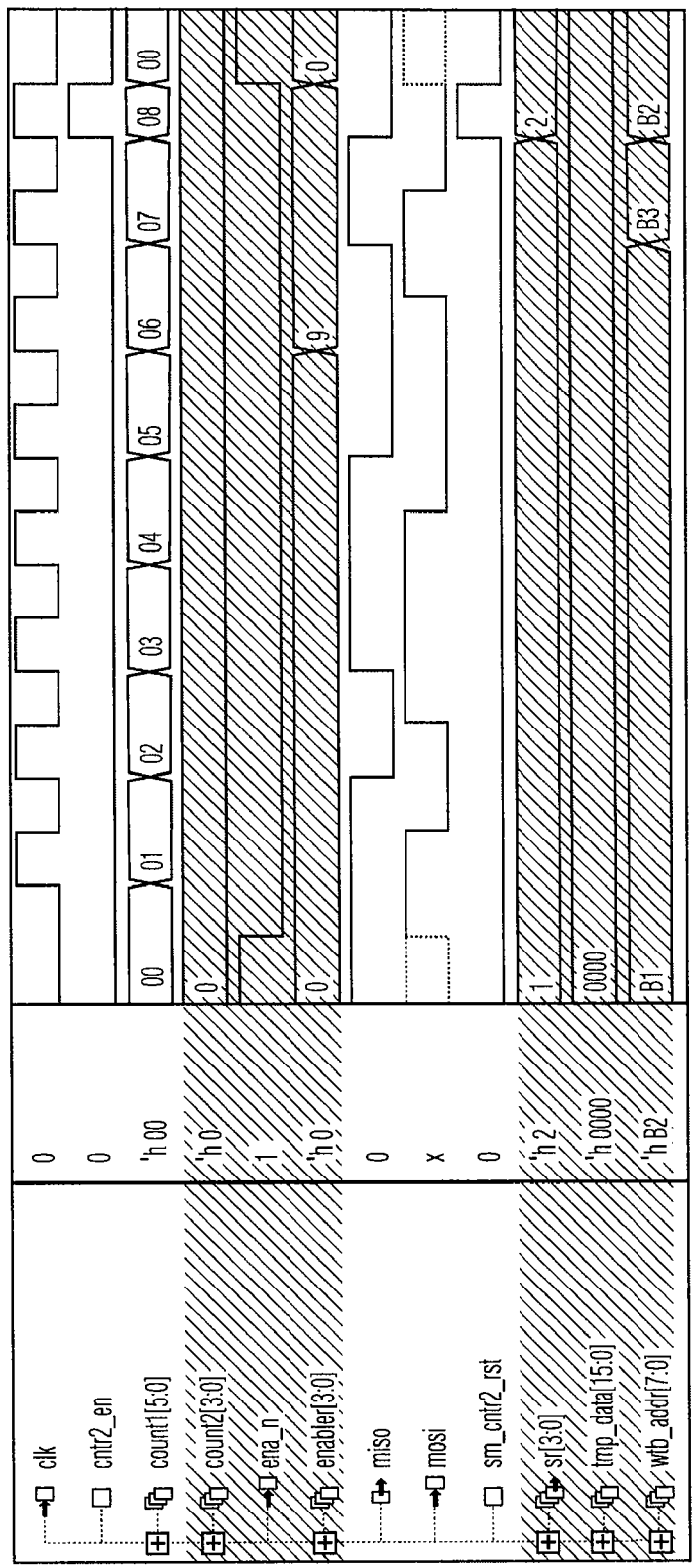
FIG. 15F illustrates a timing diagram showing signal timing for an 8-bit write operation.
Figure 15G:
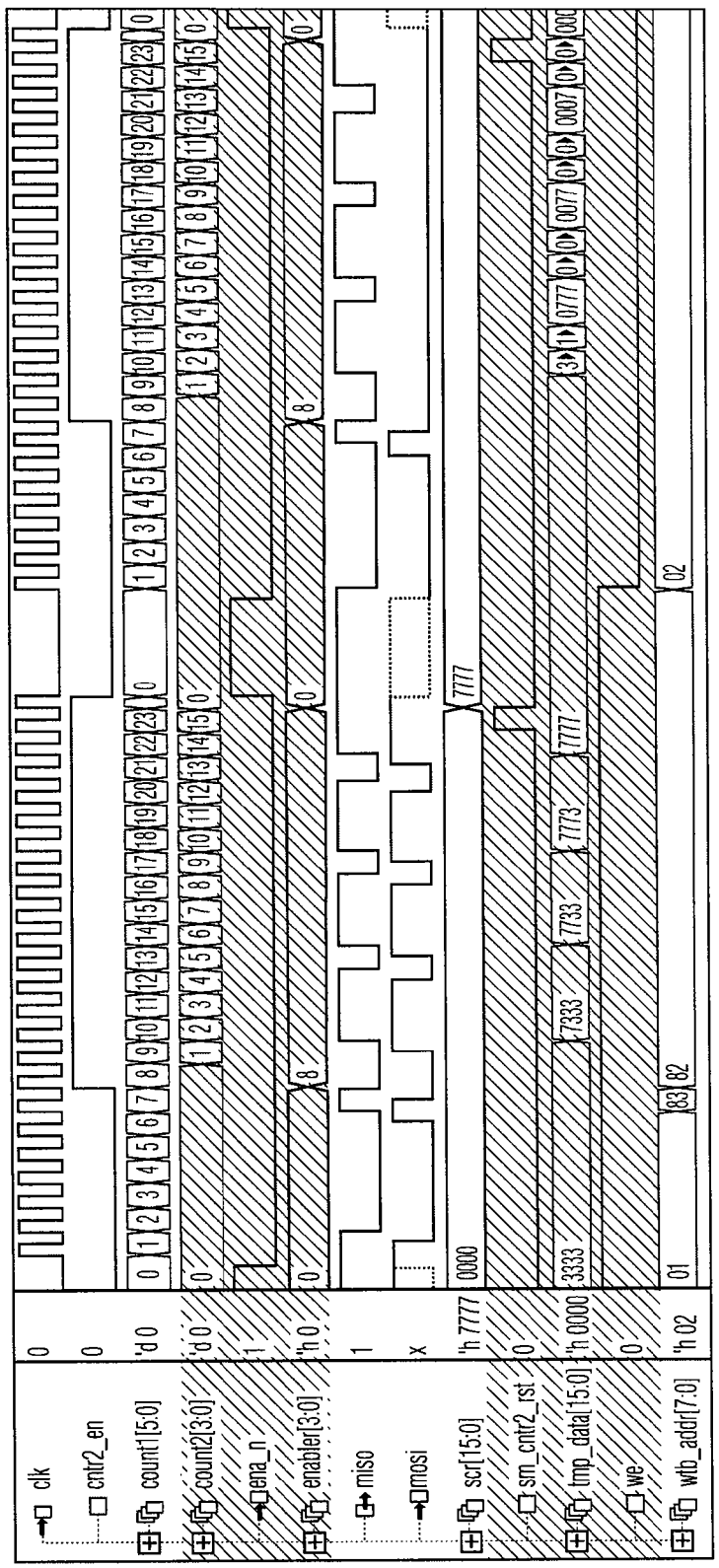
FIG. 15G illustrates a timing diagram showing signal timing for a write of data 0x777 to a scratchpad register at address 0x03, followed by a read operation.

Referring now to FIGS. 15A through 15H, there are illustrated various timing diagrams that detail various operations of FWI 410, in accordance with an exemplary embodiment of the invention. FIG. 15A illustrates the timing requirements for a direct DAC access. FIG. 15B illustrates the timing requirements of an SAR A/D conversion. FIG. 15C illustrates the timing requirements for an external normal write operation (writes to addresses 0x10 through 0x1E). FIG. 15D illustrates the timing requirements for a basic operation of the counters of FWI 410. FIG. 15E illustrates a 58-bit write operation. FIG. 15R illustrates the timing requirements for an 8-bit write operation. FIG. 15G illustrates the timing requirements for a write of data 0x777 to the scratchpad register at address 0x03, followed by a read operation. In the write operation, the MISO message mirrors the MOSI message. In the read operation, the contents of the scratchpad register are transferred out in a MISO message.

Figure 15H:
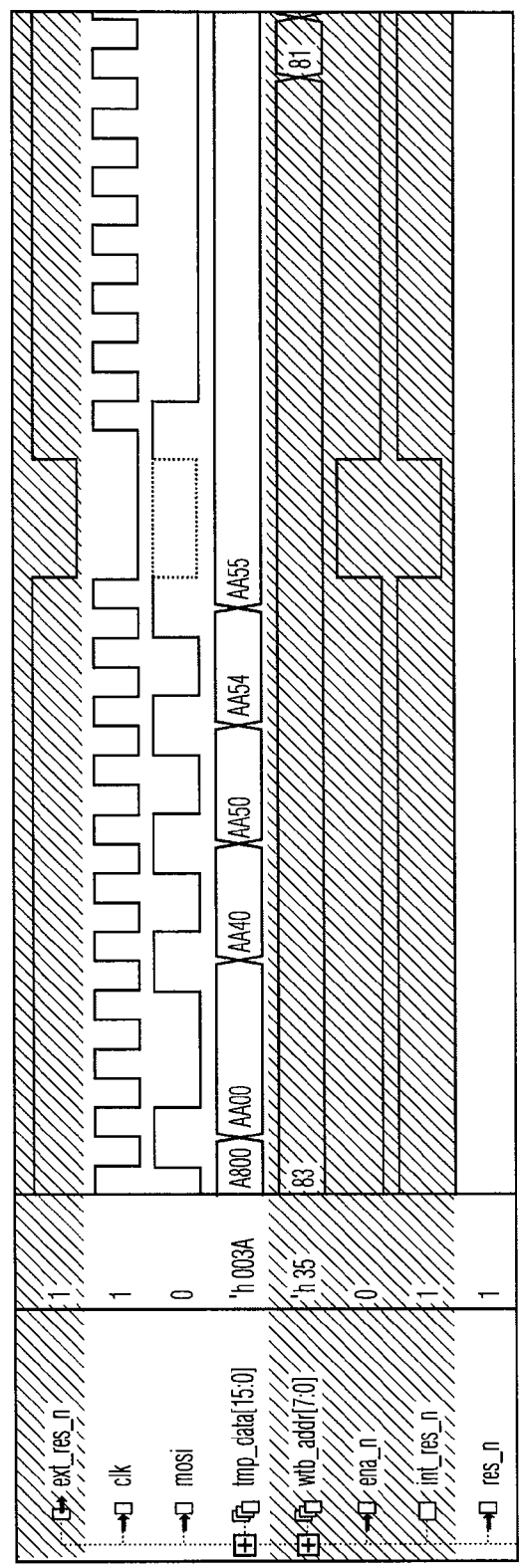
FIG. 15H illustrates a timing diagram detailing the signal timing associated with a reset operation.

FIG. 15H illustrates a timing diagram showing the behavior of int_res_n, in accordance with an exemplary embodiment of the present invention. For the most part, all registers are reset with ext_res_n. Two exceptions are register 820 (storing bits WTB_ADDR[7:0]) and register 830 (storing bits TMP_DATA[15:0]). Registers 820 and 830 are reset from res_n, as these registers are needed for controlling the soft reset. Additionally, ena_n acts as a reset for counter 825 (count1), counter 835 (count2), and enable control 825*a* (cntr2_en). On a rising edge of ena_n (end of a message transmission), these registers reset back to 0, in order to prepare to receive the next message.

As noted above, FWI 410 may be used to control a voltage controlled oscillator 480 via analog circuitry 470. Because FWI 410 controls D/A conversions specified by MOSI messages received from master control unit 420 and completes them within one clock cycle after receiving the final bit of such MOSI messages, FWI 410 provides the ability to rapidly change the reference voltages communicated via communication line 485*a* to VCO 480. Thus, FWI 410 provides the ability to quickly change the frequencies $f_1$, $f_2$, $f_3$, and $f_4$ of VCO 480. Furthermore, FWI 410 is able to quickly change a first frequency, e.g., $f_1$, while VCO 480 is outputting a second frequency, e.g., $f_2$. When done outputting the second frequency, VCO 480 may switch to the first frequency. Thus, FWI 410 improves the speed by which VCO 480 may frequency hop.

FWI 410 also provides the ability to frequently perform A/D conversions. Such operations might be useful in monitoring the control voltages for frequencies $f_1$, $f_2$, $f_3$, and $f_4$ of VCO 480 encoded in the amplitudes of voltage signals output by VCO 480 on communication line 485*b*. Because FWI 410 controls A/D conversions specified by MOSI messages received from master control unit 420 and completes them before the final bit of such MOSI messages is received, FWI 410 provides the ability to frequently digitize analog voltages communicated from VCO 480 via communication line 485*b*. The digitized representations of the voltages may be used by master control unit 420 to determine whether one of the reference voltages controlling VCO 480 needs to be changed. If master control unit 420 determines that a change is needed, it may issue a new MOSI message to FWI 410 specifying a reference voltage for VCO 480. FWI 410 converts the data bits of such MOSI message to analog and supplies it to VCO 480.

What is claimed is:

1. A method of executing multiple tasks in an integrated circuit (IC), the method comprising the steps of:
   (a) receiving a data stream;
   (b) extracting a first portion of bits from the data stream received over a first interval of time, the first portion of extracted bits comprising control bits that specify an operation;
   (c) extracting a second portion of bits from the data stream received over a second interval of time, the second portion of extracted bits comprising data bits corresponding to the operation specified by the control bits, the second interval of time coming after the first interval of time; and
   (d) executing a task using the data bits, the task dependent on the specified operation and the task started after the first interval of time is complete and before the second interval of time is complete.

2. The method of claim 1 wherein the first interval of time is shorter than the second interval of time for at least one type of the data stream received.

3. The method of claim 1 wherein the control bits specify a register that when read from or written to causes the task to be performed.

4. The method of claim 1 wherein the step of receiving the data stream further comprises receiving the data bits in order of most significant bit to least significant bit.

5. The method of claim 4 wherein the task is a digital-to-analog conversion of the data bits of the data stream and the step of executing the task further comprises performing the digital-to-analog conversion of the data bits, the most significant bit of the data bits being converted to an analog value before the least significant data bit is received.

6. The method of claim 5 wherein the receiving of the data stream is performed with reference to a stream of clock pulses and the digital-to-analog conversion of the data bits is completed before a period of time has elapsed, the period of time beginning at the receipt of the least significant data bit and ending one cycles of the clock pulses later.

7. The method of claim 4 wherein the task is an analog-to-digital conversion of an analog signal and the step of executing the task further comprises performing the analog-to-digital conversion of the analog signal, the analog-to-digital conversion beginning before the least significant data bit is received.

8. The method of claim 7 wherein the analog-to-digital conversion is completed before the least significant data bit is received.

9. An RF system on a chip configured for executing multiple tasks comprising:
   a serial input bus for receiving a data stream including control bits and data bits, the data stream configured so that the control bits are received before the data bits, the control bits specifying an operation;
   one or more registers coupled to the serial input for storing the control bits and data bits as they are received; and
   control logic configured to:
      examine the control bits as they are received to ascertain the operation specified by the control bits before the data bits are received; and
      initiate a task corresponding to the operation specified by the control bits before the data bits are received.

10. The system of claim 9 wherein the control bits specify a register that when read from or written to causes the task to be performed.

11. The system of claim 9 wherein the serial input is configured to receive the data bits in order of most significant bit to least significant bit.

12. The system of claim 11 wherein the task is a digital-to-analog conversion of the data bits of the data stream and the control circuitry is further configured to direct the digital-to-analog conversion of the data bits, the most significant bit of the data bits being converted to an analog value before the least significant data bit is received.

13. The system of claim 12 wherein the serial input is configured to receive the data stream with reference to a stream of clock pulses and the control circuitry is configured to complete the digital-to-analog conversion of the data bits before a period of time has elapsed, the period of time beginning at the receipt of the least significant data bit and ending one cycle of the clock pulses later.

14. The system of claim 11 wherein the task is an analog-to-digital conversion of an analog signal and the control circuitry is further configured to direct the analog-to-digital conversion of the analog signal, the analog-to-digital conversion beginning before the least significant data bit is received.

15. The system of claim 14 wherein the control circuitry is configured to complete the analog-to-digital conversion before the least significant data bit is received.

16. The method of claim 1 wherein
the data stream in step (a) is received by an RF system on a chip (RFSoC), and
the task executed in step (d) includes digital-to-analog conversion to control an RF output value of a voltage controlled oscillator (VCO), and an analog-to digital conversion to determine an RF input value.

17. The method of claim 1 wherein the data stream includes a plurality of packets, each packet having the first and second portions of bits,
the first portion includes the control bits and the second portion includes the data bits, and
the data bits comprise an RF value.

* * * * *